US012663119B2

(12) United States Patent
Armstrong et al.

(10) Patent No.: US 12,663,119 B2
(45) Date of Patent: Jun. 23, 2026

(54) HIGH PRESSURE FLUID DRAIN SYSTEMS, DEVICES, AND METHODS

(71) Applicant: Agility Fuel Systems LLC, Costa Mesa, CA (US)

(72) Inventors: Marlo S. Armstrong, Kelowna (CA); Chris Forsberg, Kelowna (CA); Adam Robertson, Kelowna (CA); David Cate, Nashville, TN (US); Andrew Taylor Gordon, Kelowna (CA); Momchil Yordanov, Kelowna (CA); Caitlin Cavalier, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 696 days.

(21) Appl. No.: 18/067,130

(22) Filed: Dec. 16, 2022

(65) Prior Publication Data

US 2023/0194053 A1 Jun. 22, 2023

Related U.S. Application Data

(60) Provisional application No. 63/265,865, filed on Dec. 22, 2021.

(51) Int. Cl.
*F17C 13/04* (2006.01)
*F17C 7/00* (2006.01)

(52) U.S. Cl.
CPC ................ *F17C 13/04* (2013.01); *F17C 7/00* (2013.01); *F17C 2205/0323* (2013.01);
(Continued)

(58) Field of Classification Search
CPC ...... F17C 13/04; F17C 7/00; F17C 2223/035; F17C 2205/0323; F17C 2205/037; F17C 2265/012; F17C 2270/0171; F17C 2221/033; F17C 2221/035; F17C 2205/0341; F17C 2205/0364
See application file for complete search history.

(56) References Cited

U.S. PATENT DOCUMENTS 3,005,475 A * 10/1961 Beall, Jr. .............. B65D 47/248 285/260
4,855,041 A * 8/1989 Church ................ B01D 36/001 137/203
(Continued)

FOREIGN PATENT DOCUMENTS

DE 10 2011 002 917 7/2012
WO WO 2016/075100 5/2016
(Continued)

*Primary Examiner* — Youngsul Jeong
(74) *Attorney, Agent, or Firm* — Snell & Wilmer LLP

(57) ABSTRACT

A fluid drain system for pressurized fuel systems includes a fluid drain tool that includes: an enclosure including a collection cavity; a fitting configured for removable coupling to a fluid filter drain valve to fluidly couple the fluid drain tool to the fluid filter drain valve; a tube that fluidly couples the fitting to the enclosure, such that fluid collected from the fluid filter drain valve can be transferred through the tube to the collection cavity of the enclosure; and a selectively openable valve having a first end in fluid communication with the collection cavity of the enclosure, and a second end in fluid communication with an atmosphere.

20 Claims, 17 Drawing Sheets

(52) U.S. Cl.
CPC ................. *F17C 2205/0341* (2013.01); *F17C 2205/0364* (2013.01); *F17C 2205/037* (2013.01); *F17C 2221/033* (2013.01); *F17C 2221/035* (2013.01); *F17C 2223/035* (2013.01); *F17C 2265/012* (2013.01); *F17C 2270/0171* (2013.01)

(56) References Cited

U.S. PATENT DOCUMENTS

| | | | | |
|---|---|---|---|---|
| 6,083,381 | A * | 7/2000 | Connelly | F02M 37/28 251/304 |
| 8,501,003 | B2 | 8/2013 | Allott et al. | |
| 8,845,897 | B2 | 9/2014 | Wieczorek et al. | |
| 9,003,929 | B2 | 4/2015 | Laurel | |
| 2007/0204919 | A1 * | 9/2007 | Shin | F17C 1/00 137/587 |
| 2009/0212249 | A1 | 8/2009 | Maszull et al. | |
| 2019/0196515 | A1 * | 6/2019 | Shinn | F02M 35/10229 |
| 2019/0217229 | A1 | 7/2019 | Rookey et al. | |

FOREIGN PATENT DOCUMENTS

| | | | | |
|---|---|---|---|---|
| WO | WO 2017/048154 | | 3/2017 | |
| WO | WO-2020197856 | A1 * | 10/2020 | B60K 15/07 |

* cited by examiner

HIGH PRESSURE FLUID DRAIN SYSTEMS, DEVICES, AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. For example, the present application claims priority to U.S. Provisional Patent Application No. 63/265,865, filed Dec. 22, 2021, which is incorporated herein by reference in its entirety.

BACKGROUND

Field

This application is directed to systems, devices, and methods for conducting maintenance on fuel systems, in particular for removing liquid from high pressure fuel systems used in trucks and other vehicles of various types.

Description of the Related Art

Powering vehicles with high pressure fuel systems, such as compressed natural gas fuel systems, has become more and more popular in recent years. Equipping vehicles with such systems provides various benefits, but also presents unique maintenance challenges.

SUMMARY

The present disclosure describes various embodiments of maintenance systems for high pressure fuel systems. For example, various embodiments disclose fluid drain systems for use in high pressure fuel systems. In some embodiments, a fluid drain system as disclosed herein is capable of enabling unwanted liquid, such as oil, water, and/or the like, to be removed from a high pressure fuel system without depressurizing the system and/or removing the existing fuel from the system. Some embodiments include a detachable tool that can connect to an access point in the fuel system and transfer such liquid to a remote collection container through an elongate flexible tube or other conduit. Embodiments disclosed herein can provide a number of benefits, including enabling and greatly simplifying necessary maintenance that otherwise is difficult or impossible to perform. Such simplification enhances the timeliness of such maintenance, extending the life of fuel system components, and/or the like.

According to some embodiments, a fluid drain system for high pressure fuel systems comprises a fluid filter drain valve and a fluid drain tool. The fluid filter drain valve comprises a first body and a second body. The first body may be rotatably coupled to the second body. The first body may comprise a first quick-connect fitting. The second body may be configured to be coupled to a fluid filter. The fluid filter drain valve further comprises a fluid flow path through the second body and the first body, wherein the fluid flow path is selectively openable or closable by rotation of the first body with respect to the second body. The fluid drain tool is configured to be removably coupleable to the fluid filter drain valve for draining fluid through the fluid flow path and into the fluid drain tool. The fluid drain tool comprises: a drain bowl; a second fitting; an elongate flexible hose; and a selectively openable bleed valve. The drain bowl comprises a housing that defines a collection cavity. The drain bowl may further comprise a drain cap removably coupled to the housing for draining collected fluid from the collection cavity. The second fitting may be a second quick-connect fitting configured for removable coupling to the first quick-connect fitting of the first body of the fluid filter drain valve. The elongate flexible hose comprises a lumen that fluidly couples the second quick-connect fitting to the drain bowl, such that fluid collected from the fluid filter drain valve can be transferred through the lumen of the elongate flexible hose to the collection cavity of the drain bowl. The selectively openable bleed valve may be coupled to the housing of the drain bowl, the selectively openable bleed valve having a first end in fluid communication with the collection cavity of the drain bowl, and a second end in fluid communication with an atmosphere, with a lower pressure condition or with a vacuum.

In some embodiments, the lumen of the elongate flexible hose and the collection cavity of the drain bowl are capable of containing fluid pressurized to at least 4,500 psi without failure. In some embodiments, the collection cavity of the drain bowl and the lumen of the elongate flexible hose are configured to be sealed from the atmosphere when the drain cap is coupled to the housing, the selectively openable bleed valve is closed, the second quick-connect fitting of the fluid drain tool is coupled to the first quick-connect fitting of the first body of the fluid filter drain valve, and the fluid flow path of the fluid filter drain valve is sealed from the atmosphere. In some embodiments, the collection cavity of the drain bowl and the lumen of the elongate flexible hose are configured to be in fluid communication with the atmosphere only through the second quick-connect fitting, when the drain cap is coupled to the housing, the selectively openable bleed valve is closed, and the second quick-connect fitting is not coupled to the first quick-connect fitting of the first body of the fluid filter drain valve. In some embodiments, the second quick-connect fitting comprises a check valve that selectively restricts fluid communication of the collection cavity of the drain bowl and the lumen of the elongate flexible hose with the atmosphere.

According to some embodiments, a fluid drain system for pressurized fuel systems comprises a fluid drain tool that comprises: an enclosure comprising a collection cavity; a fitting configured for removable coupling to a fluid filter drain valve to fluidly couple the fluid drain tool to the fluid filter drain valve; a tube that fluidly couples the fitting to the enclosure, such that fluid collected from the fluid filter drain valve can be transferred through the tube to the collection cavity of the enclosure; and a selectively openable valve having a first end in fluid communication with the collection cavity of the enclosure, and a second end in fluid communication with an atmosphere, with a lower pressure condition or with a vacuum.

In some embodiments, the tube comprises an elongate flexible hose. In some embodiments, the enclosure comprises a drain bowl having a housing disposed about the collection cavity, the selectively openable valve of the fluid drain tool being coupled to the housing of the drain bowl. In some embodiments, the fluid drain system further comprises the fluid filter drain valve. In some embodiments, the fitting comprises a first fitting and the fluid filter drain valve comprises: a second fitting configured for the first fitting of the fluid drain tool to be removably coupled thereto; and a selectively openable fluid flow path having a first end in fluid communication with the second fitting, and a second end configured to be in fluid communication with a fluid filter. In some embodiments, the fluid filter drain valve comprises a first body and a second body, the first body being rotatably coupled to the second body, wherein the first body comprises the second fitting, and the second body is configured to be coupled to the fluid filter. In some embodiments, the selectively openable fluid flow path is configured to be opened or closed by rotation of the first body with respect to the second body. In some embodiments, the fluid filter drain valve comprises a body and a handle rotatably coupled to the body, wherein fluid flow path is configured to be selectively openable by rotating the handle with respect to the body. In some embodiments, the fitting comprises a quick-connect fitting. In some embodiments, the enclosure comprises a drain cap, and wherein the collection cavity of the enclosure and a fluid passage of the tube are configured to be sealed from the atmosphere when the drain cap is coupled to the enclosure, the selectively openable valve of the fluid drain tool is closed, the first fitting of the fluid drain tool is coupled to the second fitting of the fluid filter drain valve, and the fluid flow path of the fluid filter drain valve is sealed from the atmosphere. In some embodiments, the enclosure comprises a drain cap, and wherein the collection cavity of the enclosure and a fluid passage of the tube are configured to be in fluid communication with the atmosphere only through the fitting, when the drain cap is coupled to the enclosure, the selectively openable valve of the fluid drain tool is closed, and the fitting is not coupled to the fluid filter drain valve. In some embodiments, the fitting comprises a check valve that selectively restricts fluid communication of the collection cavity of the enclosure and the fluid passage of the tube with the atmosphere. In some embodiments, a fluid passage of the tube and the collection cavity of the enclosure are capable of containing fluid pressurized to at least 4,500 psi without failure. In some embodiments, the enclosure comprises a drain cap and the drain cap is sealed to the enclosure using a gasket or O-ring. In some embodiments, the collection cavity of the enclosure comprises a volume of at least two ounces. In some embodiments, the elongate flexible hose comprises an oil- and gas-resistant material. In some embodiments, the valve of the fluid drain tool is downstream of the tube. In some embodiments, the valve of the fluid drain tool is coupled to the enclosure. In some embodiments, the valve of the fluid drain tool is upstream of the enclosure. In some embodiments, the valve of the fluid drain tool is coupled to the fitting. In some embodiments, the valve of the fluid drain tool is between the fitting and the enclosure.

According to some embodiments, a method of draining fluid from a high pressure fuel system comprises: obtaining a fluid drain tool, such as one of the fluid drain tools described above. The method further comprises closing a shutoff valve that seals off a fuel tank from a fuel filter. The method further comprises coupling the fitting of the fluid drain tool to a drain valve of the fuel filter. The method further comprises opening the drain valve of the fuel filter. The method further comprises closing the drain valve of the fuel filter. The method further comprises opening the valve of the fluid drain tool. The method further comprises closing the valve of the fluid drain tool. The method further comprises decoupling the fitting of the fluid drain tool from the drain valve of the fuel filter. The method further comprises opening the shutoff valve.

In some embodiments, the opening of the valve of the fluid drain tool occurs after the closing of the drain valve. In some embodiments, the opening of the valve of the fluid drain tool occurs before the closing of the drain valve. In some embodiments, the enclosure of the fluid drain tool further comprises a drain cap, and the method further comprises removing the drain cap to drain collected fluid from the collection cavity of the enclosure of the fluid drain tool. In some embodiments, the drain valve is located within a cavity of a fuel system housing of a vehicle, and wherein the tube of the fluid drain tool comprises an elongate flexible hose, the elongate flexible hose having a length sufficient to position the enclosure of the fluid drain tool outside of the cavity of the fuel system housing when the fitting is connected to the drain valve.

According to some embodiments, a fluid drain system for pressurized fuel systems comprises a fluid drain tool that comprises: an enclosure comprising a collection cavity; a fitting configured for removable coupling to a fluid filter drain valve to fluidly couple the fluid drain tool to the fluid filter drain valve, the fitting being fluidly coupled to the collection cavity of the enclosure; and a selectively openable valve having a first end in fluid communication with the collection cavity of the enclosure, and a second end in fluid communication with an atmosphere.

In some embodiments, the enclosure comprises a drain bowl having a housing disposed about the collection cavity, the valve of the fluid drain tool being coupled to the housing of the drain bowl. In some embodiments, the fluid drain system further comprises the fluid filter drain valve. In some embodiments, the fitting comprises a first fitting and the fluid filter drain valve comprises: a second fitting configured for the first fitting of the fluid drain tool to be removably coupled thereto; and a selectively openable fluid flow path having a first end in fluid communication with the second fitting, and a second end configured to be in fluid communication with a fluid filter. In some embodiments, the fluid drain valve comprises a first body and a second body, the first body being rotatably coupled to the second body, wherein the first body comprises the second fitting, and the second body is configured to be coupled to the fluid filter. In some embodiments, the selectively openable fluid flow path is configured to be opened or closed by rotation of the first body with respect to the second body. In some embodiments, the fluid drain valve comprises a body and a handle rotatably coupled to the body, wherein fluid flow path is configured to be selectively openable by rotating the handle with respect to the body. In some embodiments, the fitting comprises a quick-connect fitting. In some embodiments, the enclosure comprises a drain cap and the drain cap is sealed to the enclosure using a gasket or O-ring. In some embodiments, the collection cavity of the enclosure comprises a volume of at least two ounces.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION

Figure 1:
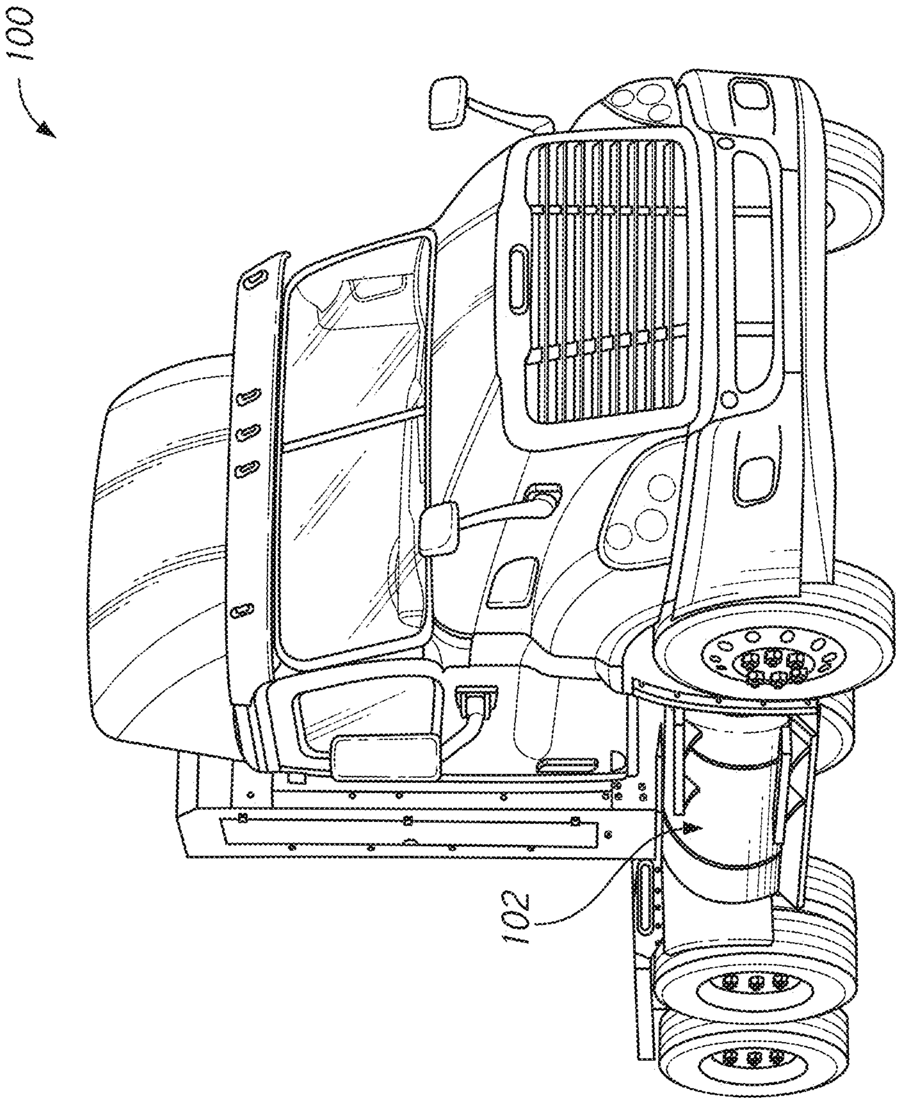
FIG. 1 is a perspective view of an embodiment of a vehicle having a high pressure fuel system.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Various types of vehicles utilize high pressure fuel systems, such as fuel systems that use compressed natural gas, propane, and/or the like as a fuel for an internal combustion engine. Examples of such vehicles are semi trucks, garbage trucks, box trucks, delivery trucks, buses, cement trucks, boats, and the like. Such high pressure fuel systems can have a variety of benefits over typical gasoline or diesel powered fuel systems, including being more efficient, having lower emissions, and/or the like.

High pressure fuel systems have at least some different maintenance requirements than low pressure fuel systems, such as gasoline or diesel powered fuel systems. For example, a high pressure fuel system may include a filter that is intended to reduce or filter out contaminants in the fuel when filling the fuel system from a fuel source. In some cases, such a filter may collect liquid and/or coalesced liquid contaminants, such as oil from a compressor that is forcing compressed natural gas into the fuel system, water that is present in the fuel, and/or the like.

In some cases, such a filter may include a drain plug that may potentially allow maintenance personnel to remove the drain plug to drain the collected liquid contaminants. Such a design has several downsides, however. For example, such a fuel system will typically be pressurized within a range of about 50-4500 psi, or higher, and the fuel system will typically need to be depressurized before removing the drain plug. This adds significant additional time and energy to remove any fuel from the fuel system and pump the fuel back into the fuel system after the maintenance procedure is completed. This additionally results in the potential for additional compressor oil and/or other contaminant to be reintroduced into the system after draining such contaminants from the filter.

Additionally, the filter is often positioned within a cavity or enclosed space of the vehicle that limits access to such a drain plug. If the drain plug is even accessible, there may be limited space within which to position a collection container, such as a cup or bowl, and removing the drain plug may thus cause the liquid contaminants to run out into the cavity of the vehicle, onto the ground, onto other surfaces of the vehicle, and/or the like, creating a mess and/or potential hazardous waste spill issue. Further, the fuel system is sometimes tightly packed on the vehicle, e.g., along the frame rails thereof with other components immediately adjacent to back, side, top and/or bottom surfaces thereof. In view of these issues, the desired preventive maintenance of periodically draining the collected liquid in the filter is often not performed at all, or is only performed on extended intervals, potentially leading to engine damage, reduced service life, and/or the like. Further, sometimes the entire filter is replaced, instead of draining the filter (particularly when the filter has no drain plug, or the drain plug is not easily accessible), leading to unnecessary waste.

The various embodiments of fluid drain or removal systems disclosed herein have a variety of benefits, including a number of benefits that address the above issues. For example, some embodiments provide a fluid drain system that enables removing collected liquid from the filter without depressurizing the fuel system. Further, some embodiments provide a fluid drain system that enables removing the collected liquid while maintaining a sealed or closed system that transfers the collected liquid to a remote collection cavity under pressure, instead of allowing the liquid to fall out of the filter under the force of gravity and create a mess and/or hazardous waste issue.

The systems disclosed herein can help to extend the service life of fuel system filters, because preventive maintenance to the fuel system can be conducted more easily and/or more regularly. Further, cost and waste can be reduced, because it will no longer be necessary to replace the entire fuel system filter in a system where it is undesirable and/or difficult to open a drain plug in the filter (and/or in a system where the fluid filter did not even include a drain plug). The systems disclosed herein can also help to extend the service life of the overall fuel system and the engine powered by the fuel system, because there is less risk of a filter that has not undergone preventive maintenance becoming full or clogged and thus allowing more contaminants to pass through into the fuel system and into the engine. Additionally, the systems disclosed herein make removing liquid from the filter easier and less messy, and thus more likely to be performed and/or to be performed on a regular basis.

In some embodiments, a fluid drain system as disclosed herein comprises a fluid filter drain valve coupled to a collection bowl of a fluid filter, and a fluid removal or drain tool that is removably coupleable to the fluid filter drain valve. For example, in some embodiments, the fluid filter drain valve may be positioned in place of a standard drain plug (e.g., at or near a bottom of a housing of the fluid filter). The fluid filter drain valve may comprise, for example, a fitting, such as a quick connect fitting, that allows the fluid drain tool to be removably coupled thereto. The fluid filter drain valve may further comprise a selectively openable or closable fluid flow path therethrough. Such fluid flow path may be selectively openable by, for example, rotating a body of the fluid filter drain valve with respect to another body of the fluid filter drain valve, turning a handle, depressing a lever or button, and/or the like. The fluid drain tool may, for example, comprise a drain bowl having a housing that defines a collection cavity, a quick connect fitting configured for removable coupling to the fitting of the fluid filter drain valve, and an elongate flexible hose fluidly coupling the quick connect fitting to the collection cavity of the drain bowl.

In use, a maintenance procedure for removing collected liquid from the filter may comprise closing a shutoff valve that seals the filter from the pressurized fuel tank, coupling the fluid drain tool to the fluid filter drain valve, opening the fluid flow path of the fluid filter drain valve, and allowing the residual pressure in the filter to force the collected liquid from the fluid filter through the elongate flexible hose into the collection cavity of the drain bowl. After the liquid has been transferred into the collection cavity, the fluid filter drain valve can be closed, and the shutoff valve that seals the filter from the pressurized fuel tank can be reopened. Such a process accomplishes retrieval of the collected liquid from the filter without opening the fuel system to the atmosphere (which would require depressurizing the fuel system and/or could introduce environmental contaminants, such as moisture, into the fuel system), and without a reduction in pressure of the fuel system (or at least with relatively little reduction in pressure of the fuel system, depending on how much of the pressurized fuel was contained in the filter and between the filter and the shutoff valve). Such a process also accomplishes retrieval of the collected liquid from the filter in a relatively clean fashion, without risking dumping the liquid out onto the ground or other surfaces of the vehicle.

In some embodiments, the maintenance procedure further comprises one or more additional beneficial procedures. For example, in some embodiments, the fluid drain tool further comprises a selectively openable bleed valve that selectively fluidly couples a portion of the fluid drain tool, such as the collection cavity, to the atmosphere. Such a feature can be beneficial, because in the example process described above, the bleed valve may be briefly opened before disconnecting the fluid drain tool from the fluid filter drain valve, in order to equalize the pressure in the collection cavity with the atmosphere before disconnecting the fluid drain tool from the fluid filter drain valve. This can help to avoid collected liquid being expelled from the tool as a liquid or mist from the quick connect fitting when the quick connect fitting is disconnected from the fluid filter drain valve.

The selectively openable bleed valve can also be beneficial in a case where the fuel system has been depressurized or is already at a relatively low pressure, such as less than about 50 psi. In such a case, there may not be enough residual pressure in the fluid filter to force the collected liquid into the collection cavity, particularly when the fluid drain tool is closed to the environment. For example, a vacuum lock may occur that prevents liquid from draining from the fluid filter to the collection cavity of the tool. In such a case, it may be desirable to open the selectively openable bleed valve during the liquid drain process, which can relieve such vacuum lock and allow collected liquid to drain from the fluid filter through the elongate flexible tube to the collection cavity through gravity.

Example Fuel System with Fluid Drain System

FIG. 1 illustrates a vehicle 100 that includes a fuel system 102. In this case, the vehicle 100 is a tractor unit of a semi truck that includes a high pressure fuel system 102, such as a fuel system that utilizes compressed natural gas, in a side mounted arrangement. The fluid drain or removal systems disclosed herein are not limited to being used with such configurations, however, and the systems and techniques disclosed herein may be utilized with any high pressure fuel system. Further, the systems and techniques disclosed herein may be useful in various other applications needing drainage or removal of collected liquid, which may include applications other than high pressure fuel systems.

Figure 2:
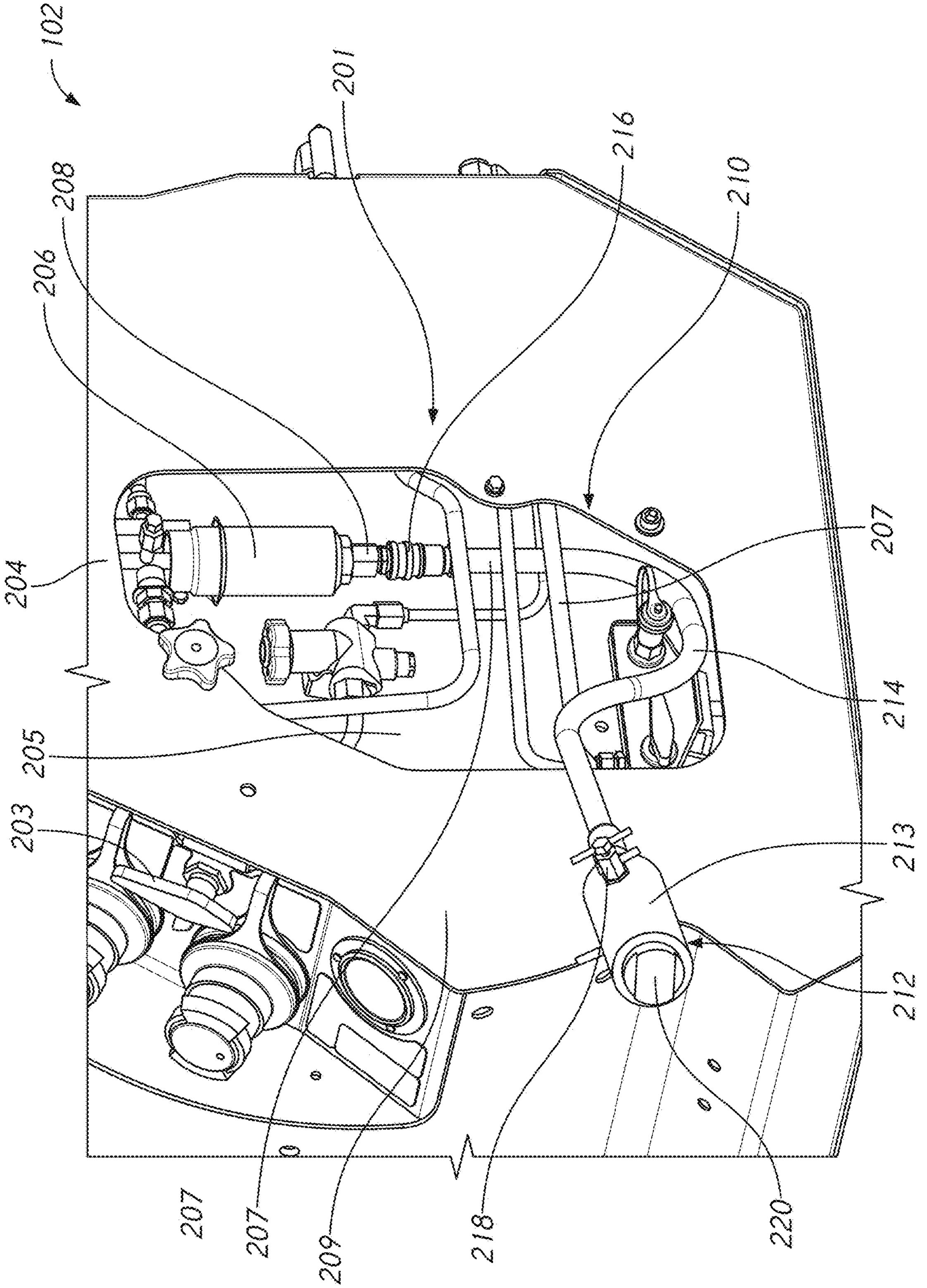
FIG. 2 is a detail perspective view of a portion of the fuel system shown in FIG. 1.

FIG. 2 illustrates a detail perspective view of a portion of the fuel system 102 of FIG. 1, with an end access panel removed in order to show some internal detail of the fuel system 102. With reference to FIG. 2, the fuel system 102 includes a fluid drain system 201, which includes a fluid filter drain valve 208 coupled to a fluid filter drain bowl or housing 206 that is part of a fluid filter 204. The fluid filter 204 is fluidly coupled to a fuel tank 205, a portion of which is visible in FIG. 2. The fluid filter 204 may be configured to filter out contaminants, liquid, and/or the like from fluid passing to and from the fuel tank 205. The fuel system 102 further comprises a shut off valve 203 positioned functionally between the fluid filter 204 and fuel tank 205, which enables selectively sealing off the fuel tank 205 from the fluid filter 204.

With continued reference to FIG. 2, the fluid drain system 201 further comprises a fluid drain tool 210 (which may also be referred to as a fluid removal tool) removably coupled to the fluid filter drain valve 208. The fluid drain tool 210 comprises a fitting 216 coupled to the fluid filter drain valve 208, a drain bowl 212 (e.g., bowl, container, device, and/or the like), and an elongate flexible hose 214 that fluidly couples the fitting 216 to the drain bowl 212. The drain bowl 212 desirably comprises a housing 213 that includes a collection cavity therein (see, e.g., collection cavity 334 of FIG. 3D), a cap or cover 220 that allows for draining of the collection cavity, and a bleed valve 218 that allows for selectively fluidly coupling the cavity of the housing 213 to the atmosphere. Although the fuel system 102 illustrates one example that locates fuel tanks 205 on a side location of the vehicle 100, other systems can position the fuel tanks differently, package associated components around the fuel tanks differently, and/or the like. For example, a fuel system configured to support fuel tanks behind a cab of a tractor unit can be serviced using the fluid drain tool 210. A fuel system configured to support fuel tanks on a rooftop of a vehicle, e.g., of a bus or other large vehicle, can be serviced using the fluid drain tool 210. A fuel system configured to support fuel tanks on a tailgate or other portion of a vehicle can be serviced using the fluid drain tool 210. In some embodiments, differences in fuel tank positioning and/or in packaging of support components such as filters near the fuel tanks, may lead to it being desirable to use modified embodiments of the fluid drain tool 210. For example, some embodiments may include a longer or shorter hose 214, may change the fitting 216 to be an angled fitting, such as a 45 degree fitting or a right angle fitting, may include more than one bleed valve 218 and/or position the bleed valve 218 differently, and/or the like.

As can be seen in FIG. 2, the fluid filter housing 206 is positioned within an enclosed cavity of housing 209 of the fuel system 102, and is also positioned adjacent to a number of other fuel system components, such as a number of tubes 207. If the fluid filter housing 206 merely included a drain plug that can be removed to drain collected liquid, it would be difficult to position a cup or other collection component beneath the drain plug to collect the liquid that drains out of the fluid filter housing 206 after removing the drain plug. Trying to do so would at a minimum be a frustrating process and would likely result in a messy process that spills at least some of the draining liquid onto the tubes 207, into the internal cavity of the fuel system housing 209, and/or the like. The fluid drain system 201 shown in FIG. 2 solves this problem, by, for example, allowing a relatively small distal end of the fluid drain tool 210 that includes a quick connect fitting 216 to be easily coupled to the fluid filter drain valve 208, and allowing the bulkier components of the fluid drain tool 210, namely the drain bowl 212, to be positioned at a convenient location outside of the housing 209 of the fuel system 102. Further, because the fluid drain tool 210 can be coupled to the fluid filter drain valve 208 in a sealed fashion (such as by using mating quick connect fittings that form a sealed connection), residual pressure within the fluid filter 204 can be used to force collected liquid out of the fluid filter housing 206 and into the fluid drain tool 210 without requiring that the drain bowl 212 be positioned in a particular location, such as below the fluid filter 204 (which would be required if gravity were used to drain the fluid filter drain bowl 206).

Example Fluid Drain System Components

Figure 3A:
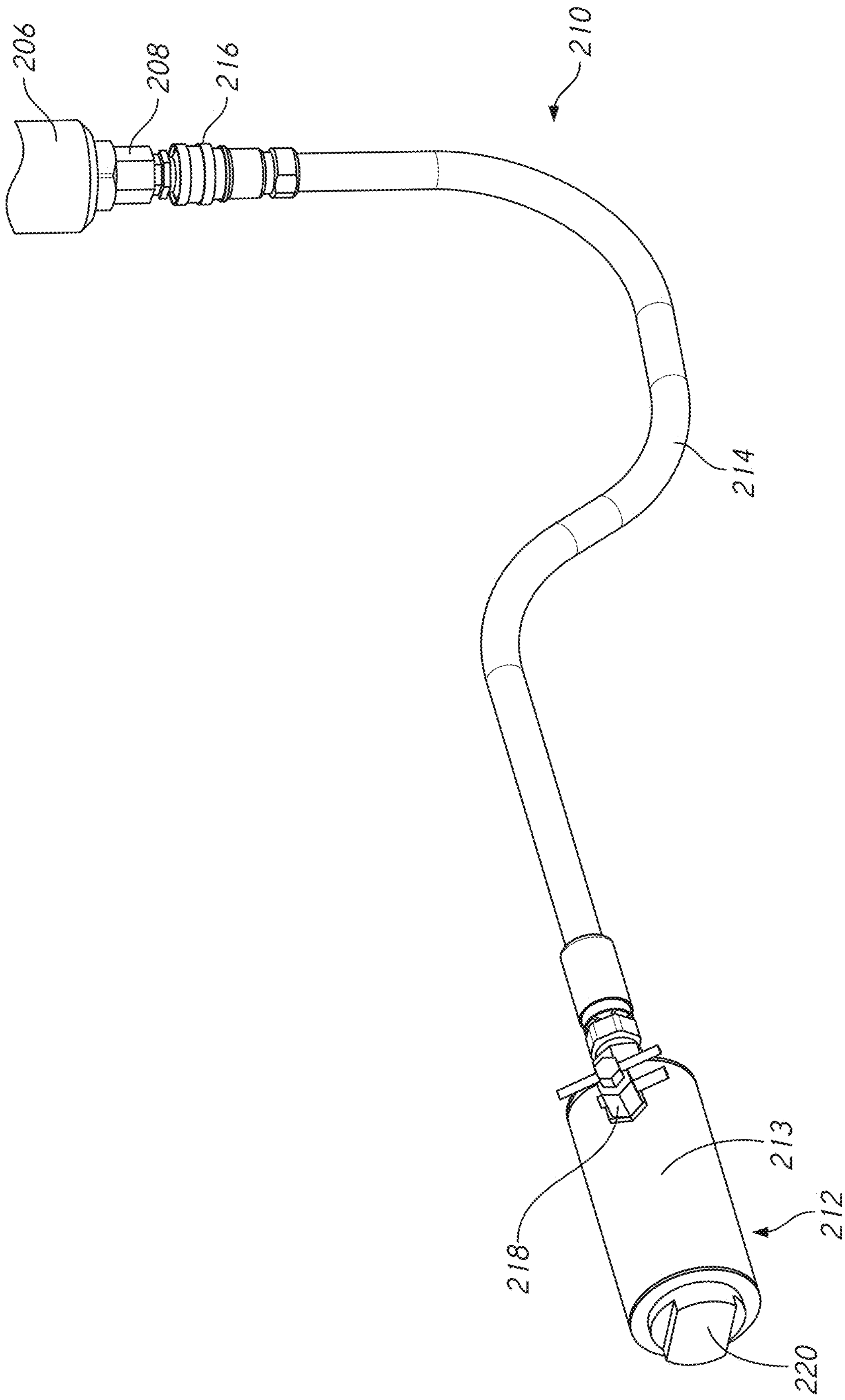
FIG. 3A is a perspective view of a fluid drain system of the fuel system of FIG. 2.
Figure 3B:
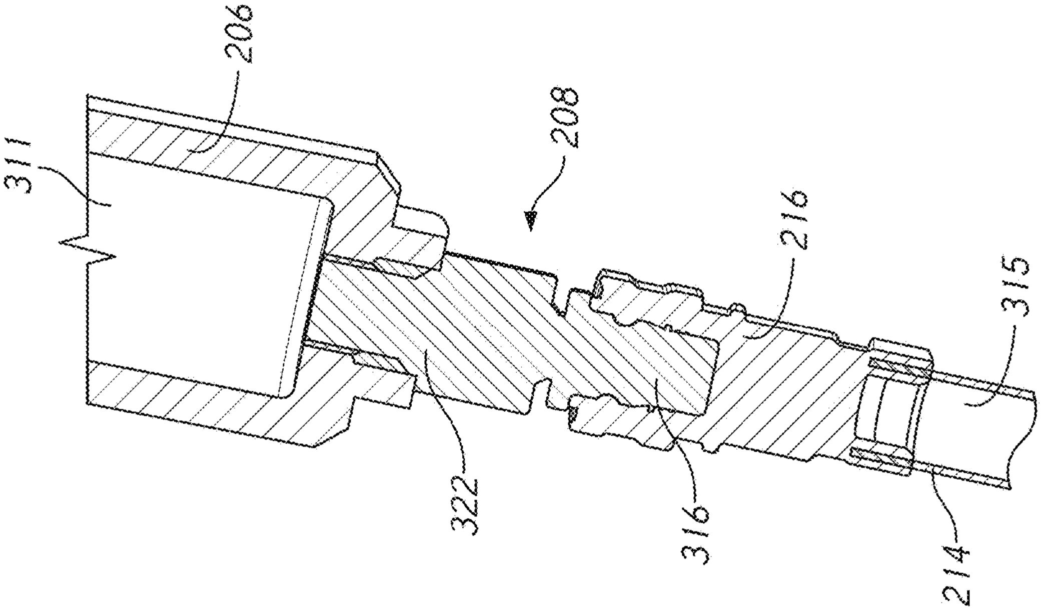
FIG. 3B is a detail cross-sectional view of a portion of a fluid filter drain bowl, fluid filter drain valve, and fluid drain tool of the fluid drain system of FIG. 3A.

FIGS. 3A-3I illustrate additional details of the fluid drain or removal system 201 of FIG. 2. FIG. 3A illustrates a portion of the fluid filter drain bowl or housing 206, the fluid filter drain valve 208, and the fluid drain or removal tool 210 coupled to the fluid filter drain valve 208. FIG. 3B illustrates a detail cross-sectional view of a portion of the fluid filter housing 206, the fluid filter drain valve 208, the fitting 216 of the fluid drain tool 210, and a portion of the elongate flexible hose 214 of the fluid drain tool 210. With reference to FIG. 3B, it can be seen that the fluid filter housing 206 comprises an internal cavity 311 in which liquid collected by the fluid filter, such as oil, water, and/or the like, may be stored until removed by the fluid drain tool. Further, it can be seen that the flexible elongate hose 214 comprises a lumen 315 through which such collected liquid may be transferred to the collection cavity 334 of the drain bowl 212 (see FIG. 3D).

Although the embodiment of FIG. 3A includes a flexible elongate hose or tube 214, some embodiments may utilize a rigid, semi-rigid, semi-flexible, and/or the like hose or tube. For example, a fluid drain system may include a rigid tube in place of the flexible elongate hose 214, and the rigid tube may be straight, bent, preformed into a shape that makes it easier to position the fitting 216 and drain bowl 212 at appropriate locations during service of a particular vehicle or system, and/or the like. Further, some embodiments may not include such a hose or tube, and, for example, may have the fitting 216 connected directly to the drain bowl 212 and/or formed as part of the drain bowl 212. Such an embodiment may be desirable, for example, in a situation where there is sufficient space to position the drain bowl 212 near the drain valve 208.

The cross-sections of the fluid filter drain valve 208 and fitting 216 of FIG. 3B are shown as solid representations, without showing details of the internal features of those components. In use, however, the fluid filter drain valve 208 and fitting 216 will include at least some internal features not visible in FIG. 3B. For example, the fitting 216 may include a fluid passage that allows fluid to be transferred from the fluid filter drain valve 208 to the lumen 315 of the elongate flexible hose 214 (see, for example, the fitting 516*a* of FIG. 5, discussed below). As another example, the fluid filter drain valve 208 may include a selectively openable fluid passage that allows fluid to be transferred from the cavity 311 of the fluid filter drain bowl or housing 206 to the fitting 216 of the fluid drain tool 210 (see, for example, the structures of FIGS. 4A-4C, discussed below).

Figure 3C:
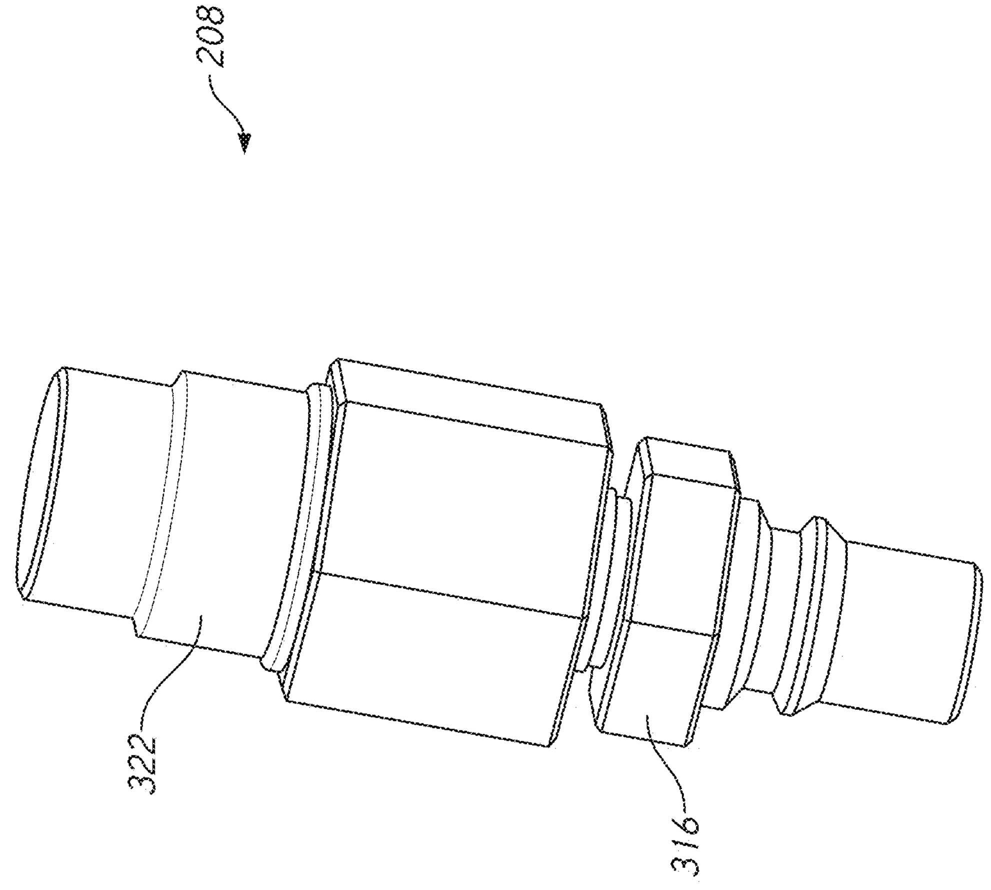
FIG. 3C is a perspective view of the fluid filter drain valve of the fluid drain system of FIG. 3A.
Figure 5:
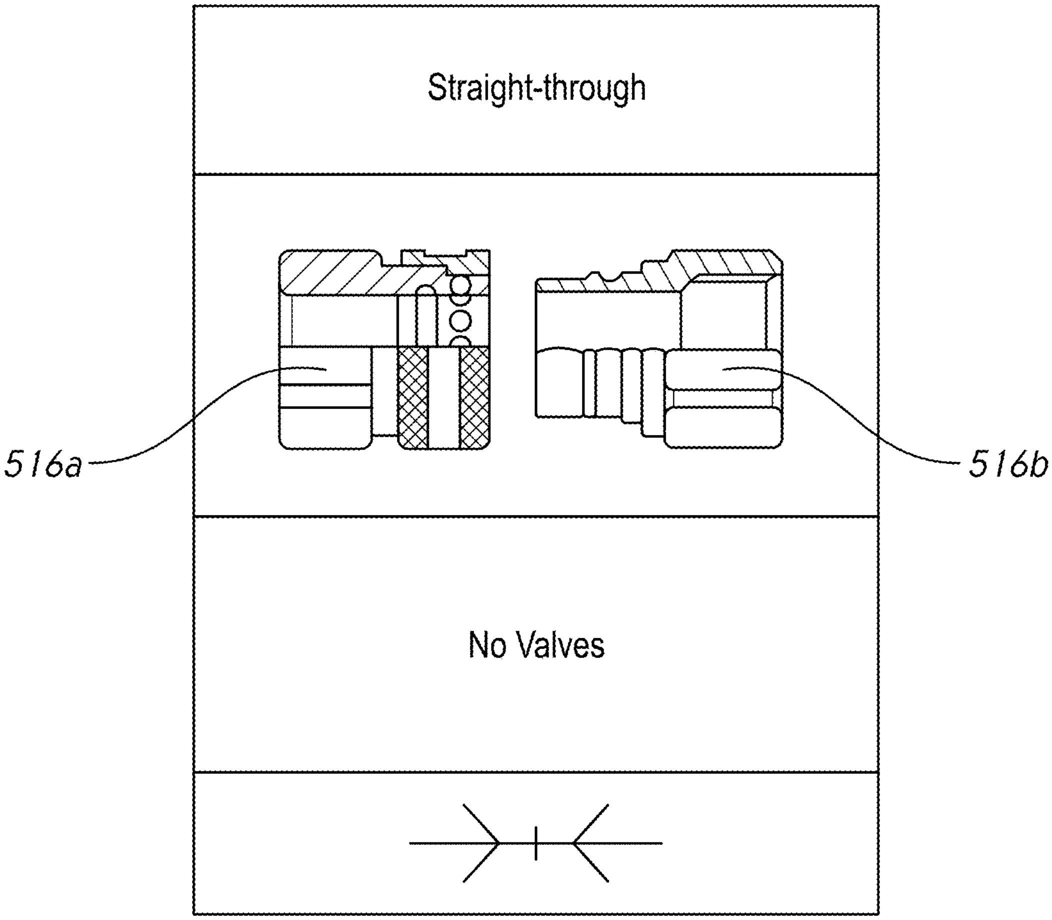
FIG. 5 illustrates a cross-sectional exploded view of an embodiment of a quick-connect system.

FIG. 3C is an external perspective view showing more detail of the fluid filter drain valve 208. The fluid filter drain valve 208 desirably comprises a first body 316 that is rotatable with respect to a second body 322. The first body 316 may comprise a fitting, such as a quick connect fitting configured to be coupled to the quick connect fitting 216 of the fluid drain tool 210, as can be seen in FIG. 3B. In this embodiment, the fitting is desirably an ISO 7241 Type B non-valved fitting. Various other configurations may be utilized, however. For example, some embodiments may utilize valved quick connect couplings (e.g., couplings that include check valves) instead of non-valved quick connect couplings. FIG. 5 illustrates one type of straight through non-valved quick connect fitting that could be used for fittings 216 and 316 of FIGS. 3B and 3C. For example, fitting 516*a* of FIG. 5 could be used for fitting 216 of FIG. 3B, and fitting 516*b* of FIG. 5 could be used for fitting 316 of FIGS. 3B and 3C.

With continued reference to FIG. 3C, the second body 322 may desirably comprise an SAE ORB fitting that is configured to couple to and seal against a portion of the fluid filter drain bowl or housing 206 (such as in the position shown in FIG. 3B). Various other types of fittings or connections between the second body 322 and the fluid filter housing 206 may be used.

In this embodiment, the fluid filter drain valve 208 desirably is configured to open or close its selectively openable fluid flow path by rotating the first body 316 with respect to the second body 322. Other embodiments may selectively open or close the fluid flow path in other ways, such as by including a quarter turn valve, including a movable handle or knob extending from a body of the fluid filter drain valve 208, and/or the like.

Figure 3D:
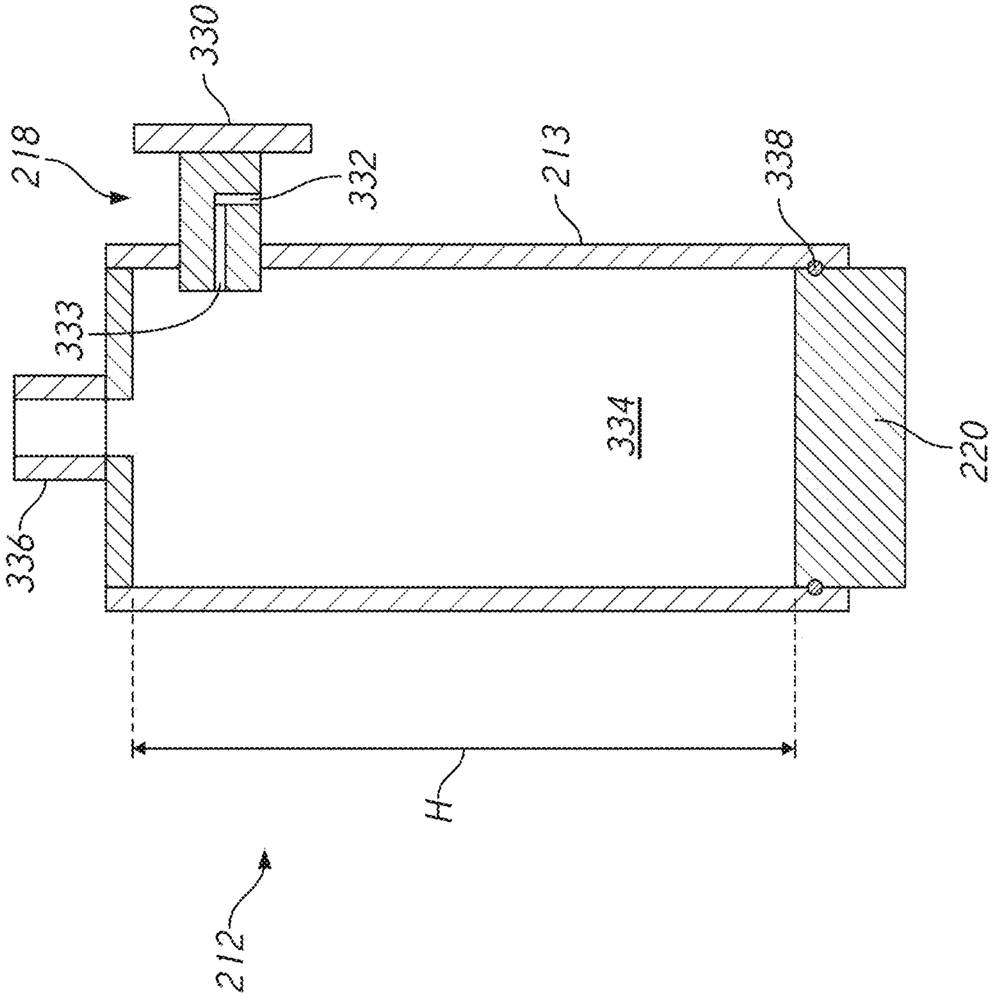
FIG. 3D is a schematic cross-sectional view of a drain bowl of the fluid drain tool of the fluid drain system of FIG. 3A.

FIG. 3D illustrates a schematic cross-sectional view of the drain bowl 212 of the fluid drain tool 210 of FIG. 3A. The drain bowl 212 comprises a housing 213 that encloses a collection cavity 334. The drain bowl 212 further comprises a cap or cover 220 that is removably coupled to a proximal end of the housing 213 and sealed to the housing 213 using an O-ring or other seal 338. Removing the cap or cover 220 and enable, for example, draining of collected fluid from the drain bowl 212. In some embodiments, instead of or in addition to the cap or cover 220, a valve or other drain mechanism may be included to drain collected liquid from the drain bowl 212.

In some embodiments, the collection cavity 334 comprises a volume of at least two ounces. In some embodiments, the collection cavity 334 comprises a volume of at least 1, 1.5, 2, 2.5, 3, 3.5, 4, 5, 6, 7, 8, 9, 10, 11, 12, 13, 14, 15, or 16 ounces, or has a volume within a range defined between any two of the foregoing numbers.

With continued reference to FIG. 3D, the drain bowl 212 further comprises a fitting or attachment member 336 at its distal end for coupling the drain bowl 212 to the elongate flexible hose 214 of FIG. 3A. The drain bowl 212 further comprises a selectively openable bleed valve 218 that selectively fluidly couples the collection cavity 334 to the atmosphere through fluid flow path 332. In this embodiment, a knob or handle 330 can be rotated to selectively open or close the fluid flow path 332. In this embodiment, the bleed valve 218 is positioned near the distal end of the housing 213 (or near the upper end of the housing 213 if the housing 213 is oriented as shown in FIG. 3D). Positioning the bleed valve 218 in this location can be desirable, for example, such as to position the opening 333 into fluid flow path 332 above a level of collected liquid when the housing 213 is oriented as shown in FIG. 3D, in order to limit or avoid expelling collected liquid into the environment when the bleed valve 218 is opened. In some embodiments, the collection cavity 334 can comprise a height H, and the opening 333 of the fluid flow path 332 into the collection cavity 334 can be positioned within an upper 25% of the height H. In some embodiments, the opening 333 of the fluid flow path 332 can be positioned within an upper 10%, 15%, 20%, 25%, 30%, 35%, 40%, 45%, or 50% of the height H. The opening 333 of the fluid flow path 332 can be located anywhere over a range of positions defined between any two of the foregoing percentage values of the height H. Further, in some embodiments, the bleed valve 218 can be positioned somewhere other than in the housing 213. For example, the bleed valve 218 may be positioned in the fitting 336, in a portion of the elongate flexible hose 214 of FIG. 3A, in a portion of the fitting 216 of FIGS. 3A and 3B, in a portion of the fluid filter drain valve 208 of FIGS. 3A and 3B, and/or the like.

The bleed valve 218 may utilize any valve structure that allows selective opening or closing of the fluid flow path 332. For example, the bleed valve 218 may comprise an axial valve, a non-axial valve, a quarter turn valve, a gate valve, a needle valve, and/or the like. In some embodiments, it is desirable, but not required, to utilize a valve structure that allows for gradual opening of the fluid flow path, such as a needle valve and/or the like. This can be desirable, for example, to limit or avoid expelling mist or liquid out of the bleed valve 218 when the bleed valve is opened to equalize the drain bowl's pressure with the atmosphere. In some embodiments, the bleed valve 218 may include a polytetrafluoroethylene (PTFE) membrane or film (or other generally waterproof material that still allows air to pass through) in order to help limit or avoid expelling mist or liquid out of the bleed valve 218 when the valve is opened to equalize the drain bowl's pressure with the atmosphere.

Figure 3F:
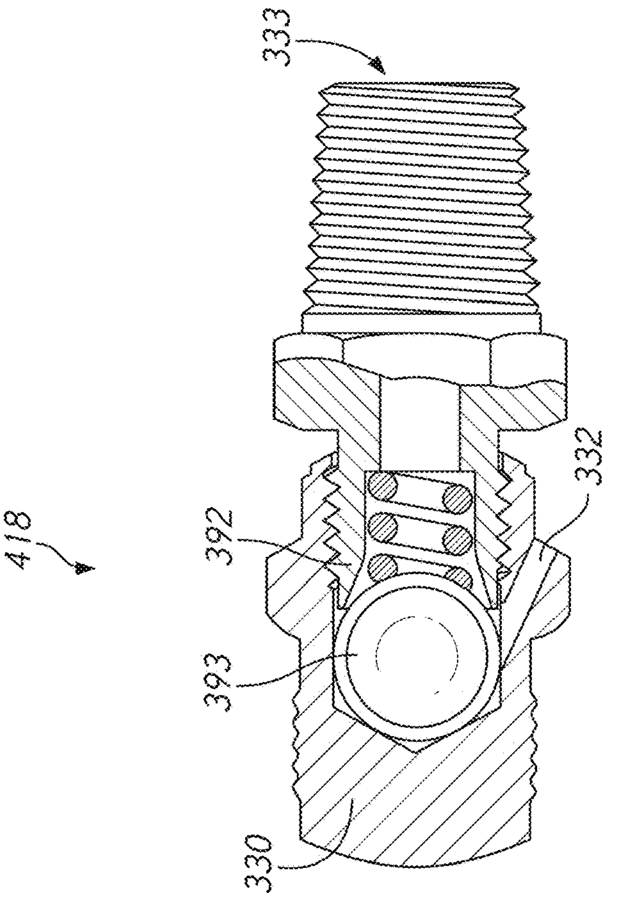
FIG. 3F is a partial cross-sectional view of another embodiment of a bleed valve that can be used with the fluid drain system of FIG. 3A.
Figure 3E:
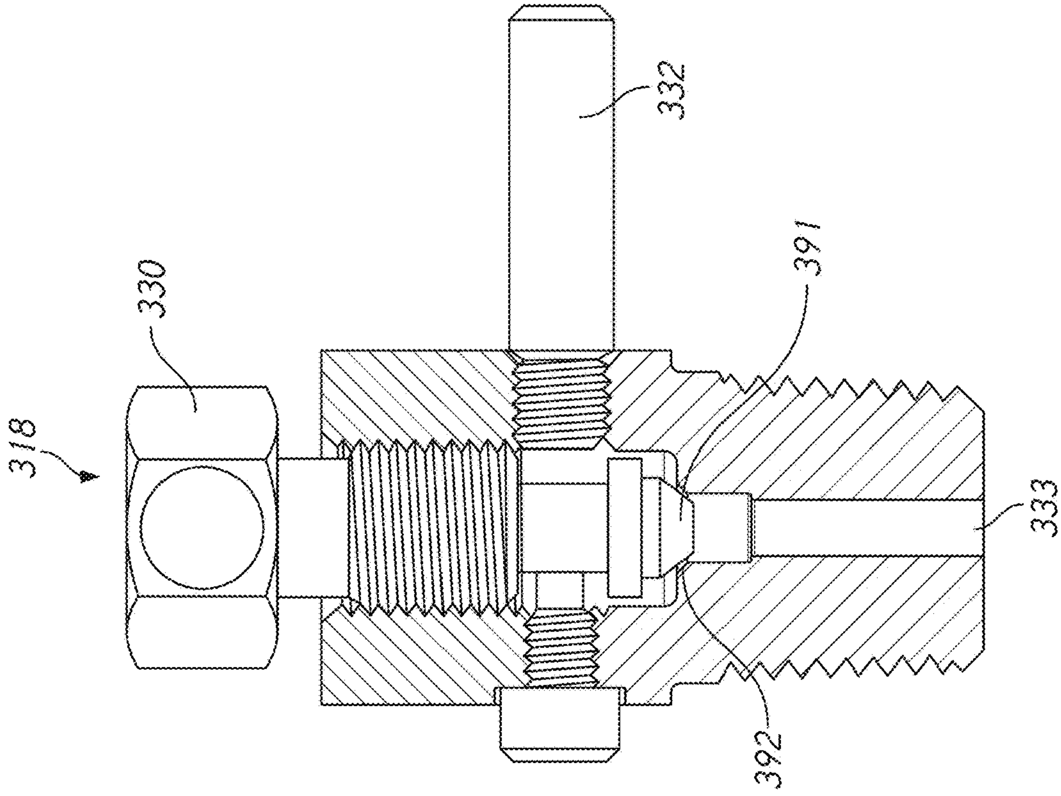
FIG. 3E is a partial cross-sectional view of an embodiment of a bleed valve that can be used with the fluid drain system of FIG. 3A.

Details of two example embodiments of bleed valve structures are shown in FIGS. 3E and 3F. For example, FIG. 3E illustrates a partial cross-sectional view of a bleed valve 318 that may be used as the bleed valve for any embodiment disclosed herein. Like the bleed valve 218 of FIG. 3D, the bleed valve 318 includes a knob or handle 330 that is rotatable to open or close a fluid flow path 332. In this embodiment, the fluid flow path 332 is open or closed depending on whether tapered surface 391 is positioned against a mating surface 392 of the main body of the bleed valve 318. Adjustment of the knob or handle 330 can also desirably control the size of the space between the tapered surface 391 and mating surface 392, to control the flow rate of fluid through the bleed valve 318. FIG. 3F illustrates another example embodiment of a bleed valve 418, which has many similarities to the bleed valve 318 and can also be used as the bleed valve for any embodiment disclosed herein. One difference in the bleed valve 418 is that the fluid flow path 332 is opened or closed depending on the positioning of a spring-loaded ball 393 with respect to the mating surface 392 in the main body of the bleed valve instead of tapered surface 391.

Figure 3I:
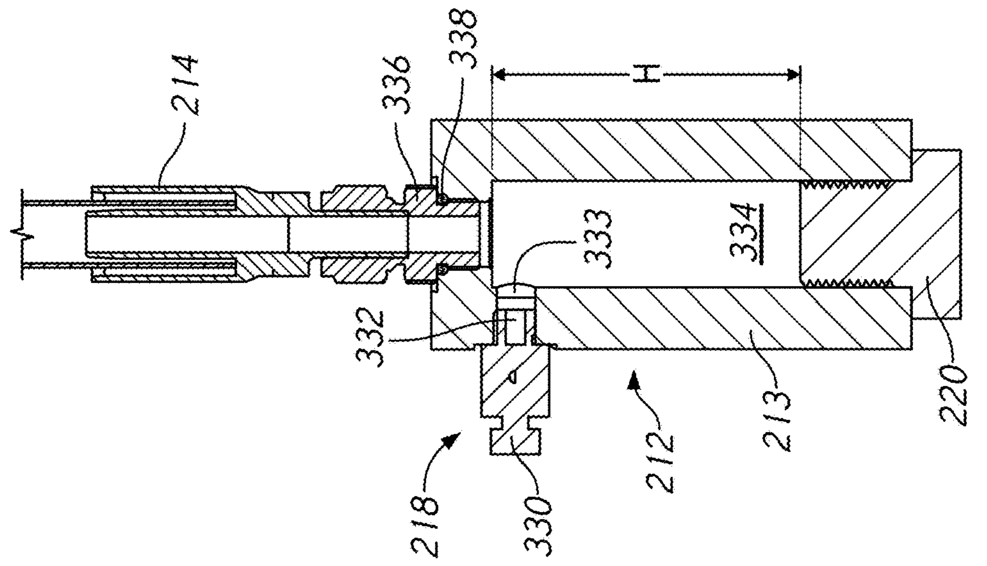
FIGS. 3G-3I are front, side, and cross-sectional views of the drain bowl of the fluid drain tool of the fluid drain system of FIG. 3A.
Figure 3H:
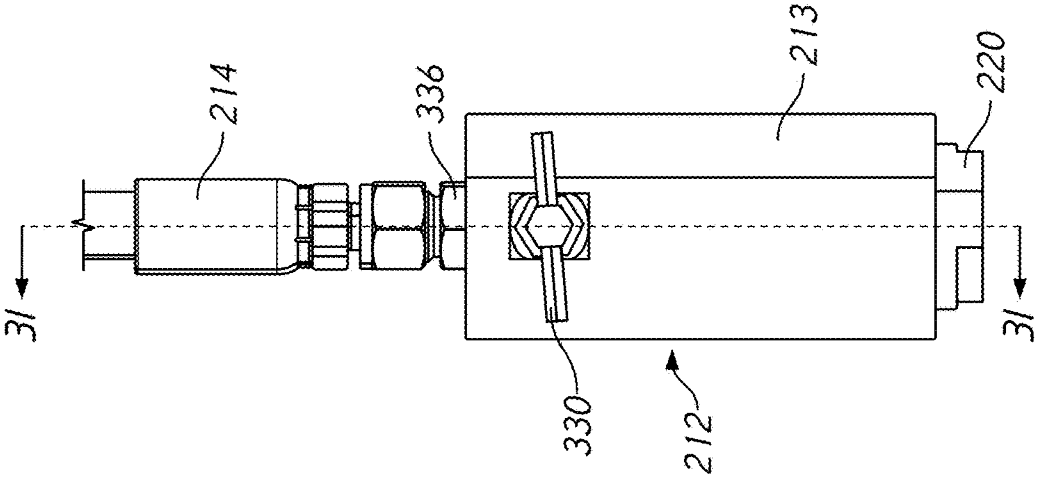
Figure 3G:
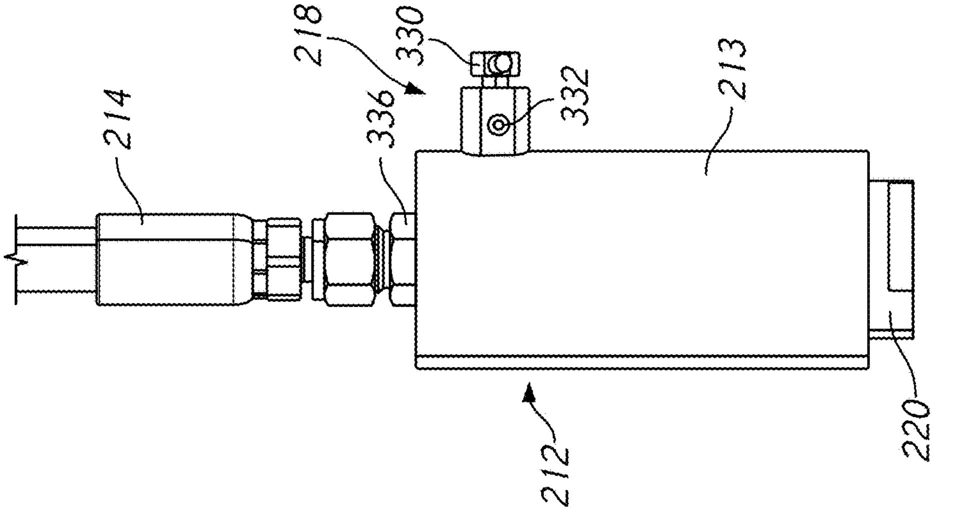

FIGS. 3G-3I illustrate additional views of the drain bowl 212, with these figures illustrating many of the same features as the schematic view of FIG. 3D. The same or similar reference numbers as used in FIG. 3D are used to refer to the same or similar components, and the following description focuses on differences between the schematic view of FIG. 3D and the views of FIGS. 3G-3I. One difference in FIG. 3I is that the volume of the collection cavity 334 is shown somewhat smaller than the volume of the collection cavity 334 of FIG. 3D; however, the volume of the collection cavity 334 of FIG. 3I may be any of the volumes or ranges of volumes discussed above with reference to FIG. 3D. Additionally, the opening 333 into the bleed valve 218 is positioned at or adjacent the uppermost edge of the collection cavity 334 in FIG. 3I, instead of somewhat below the top of the collection cavity 334 in FIG. 3D. For example, in FIG. 3I, the entire opening 333 is desirably positioned within the top 15% of the height H. The opening 333 may alternatively be positioned at any of the positions discussed above with reference to FIG. 3D. Further, although an O-ring is not shown in FIG. 3I to seal the cap 220 to the housing 213, an O-ring similar to the O-ring 338 of FIG. 3D may be included, and/or any other suitable sealing mechanism may be utilized. Additionally, FIG. 3I includes an O-ring 338 (and/or other sealing mechanism) that seals the fitting 336 to the housing 213, and such an O-ring (and/or other sealing mechanism) could also be included in the embodiment of FIG. 3D.

Returning to FIG. 3A, in some embodiments, the elongate flexible hose 214 is relatively long, to enable positioning of the drain bowl 212 remote from the housing 209 of the fuel system (see FIG. 2). For example, the elongate flexible hose 214 may comprise a length that is at least 20 times an outer diameter of the elongate flexible hose 214. In some embodiments, the elongate flexible hose 214 may comprise a length that is at least 10, 15, 20, 25, or 30 times an outer diameter of the elongate flexible hose 214. In some embodiments, it may be desirable to have an even longer length, such as for applications where the drain valve 208 is located more deeply within a vehicle enclosure, on a roof, and/or the like.

Figure 8:
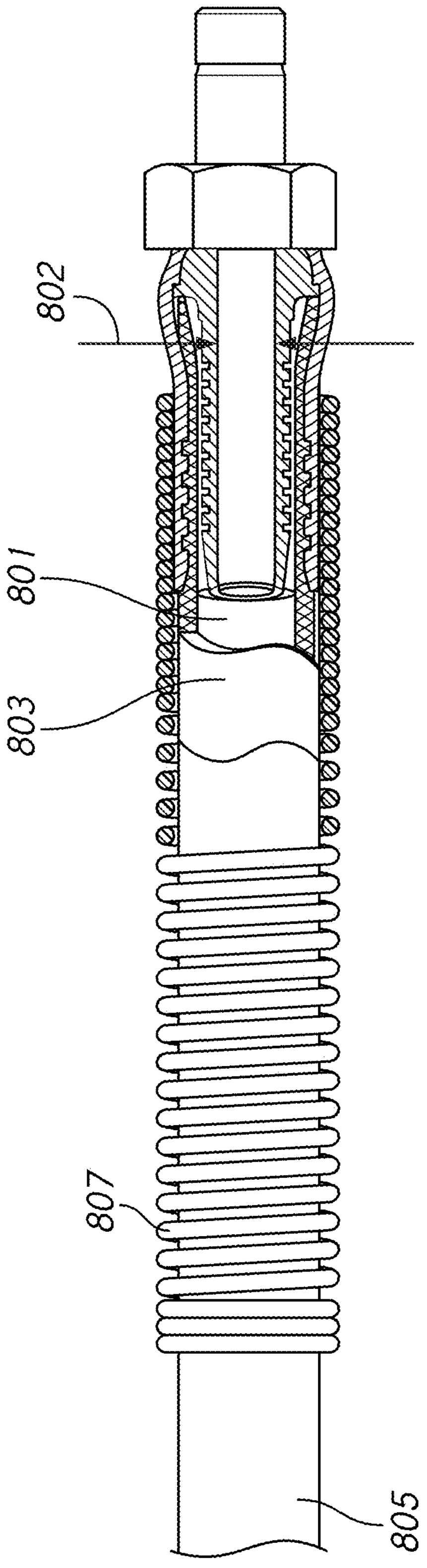
FIG. 8 illustrates an example embodiment of a hose structure that can be used with the fluid drain system of FIG. 3A.

In some embodiments, the elongate flexible hose comprises a material that is capable of containing fluid pressurized to at least 3,600 psi or to at least 4,500 psi. In some embodiments, the elongate flexible hose comprises a material that comprises a maximum allowable working pressure (MAWP) of at least 5,000 psi or 6,000 psi. In some embodiments, the hose comprises an oil- and gas-resistant material. In some embodiments, the elongate flexible hose comprises a rubber material. In some embodiments, the elongate flexible hose comprises a thermoplastic hose. In some embodiments, the elongate flexible hose comprises a multi-layer structure that include a core comprising metal, PTFE, PFA, vinyl, nylon, polyethylene, rubber, and/or the like. In some embodiments, a load-bearing braid can be included and can comprise stainless steel, nylon, aramid, and/or the like. In some embodiments, the elongate flexible hose comprises the example hose structure shown in FIG. 8, which includes a core 801, reinforcement 803, cover 805, and spring guard 807. The hose structure can have a minimum inside diameter 802 which can be the smallest inside diameter of the hose prior to assembly. In some embodiments, not all of these components are included. For example, the spring guard 807 may not be included in some embodiments.

In some embodiments, the core 801 can be the innermost material of the hose that carries the system media, often referred to as the wetted surface. In some embodiments, the reinforcement 803 can be material used to reinforce the core 801 and increase its pressure-containing capacity. In some embodiments, the cover 805 can be the outermost material of a hose, used to protect the reinforcement 803 and core 801 from environmental conditions and wear. In some embodiments, the spring guard 807 can be a helical metal spring used to protect the hose from abrasion, overbending and kinking.

In some embodiments, all components of the drain tool that will be exposed to pressure from the fluid filter when the valve 208 is opened, including the hose 214, fitting 216, and drain bowl 212, comprise materials and designs that are capable of containing fluid pressurized to at least 3,600 psi or to at least 4,500 psi without failure. In some embodiments, the housing 213 of the drain bowl 212 comprises metal, such as steel, aluminum, and/or the like. In some embodiments, at least the valve 208 comprises materials such as steel, aluminum, and/or the like, that are capable of not only withstanding at least 3,600 psi or at least 4,500 psi of pressure without failure, but also capable of withstanding temperatures within a range of −40° F. to 250° F.

Example Fluid Filter Drain Valve Internal Features

Figure 4C:
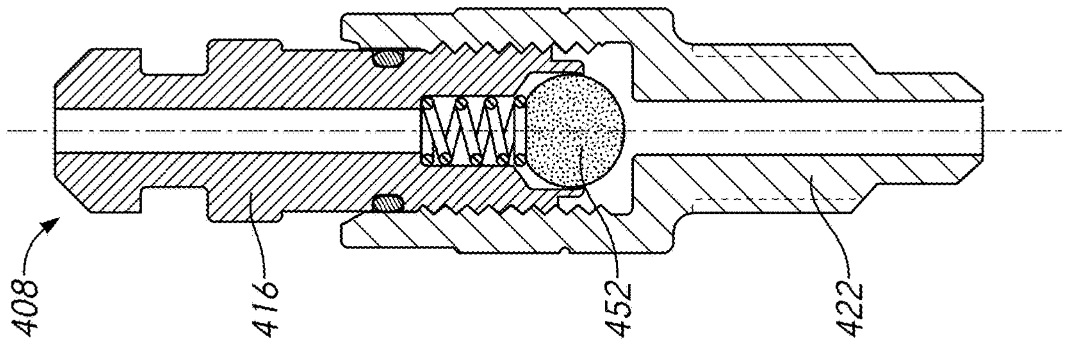
FIGS. 4A-4C illustrate cross-sectional views of an embodiment of a drain valve.
Figure 4B:
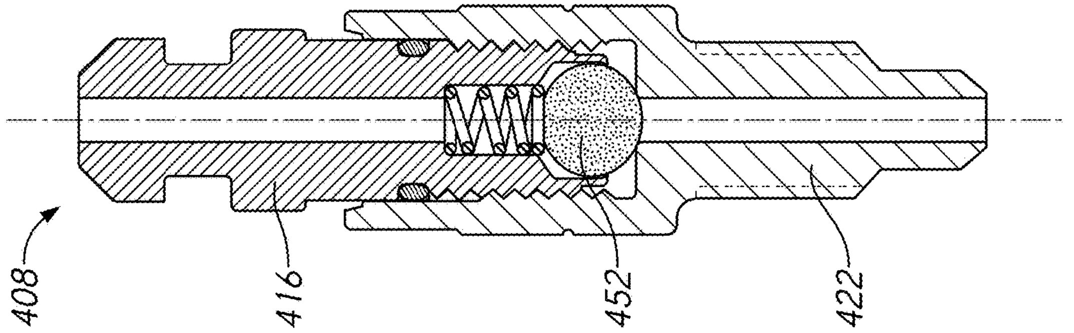
Figure 4A:
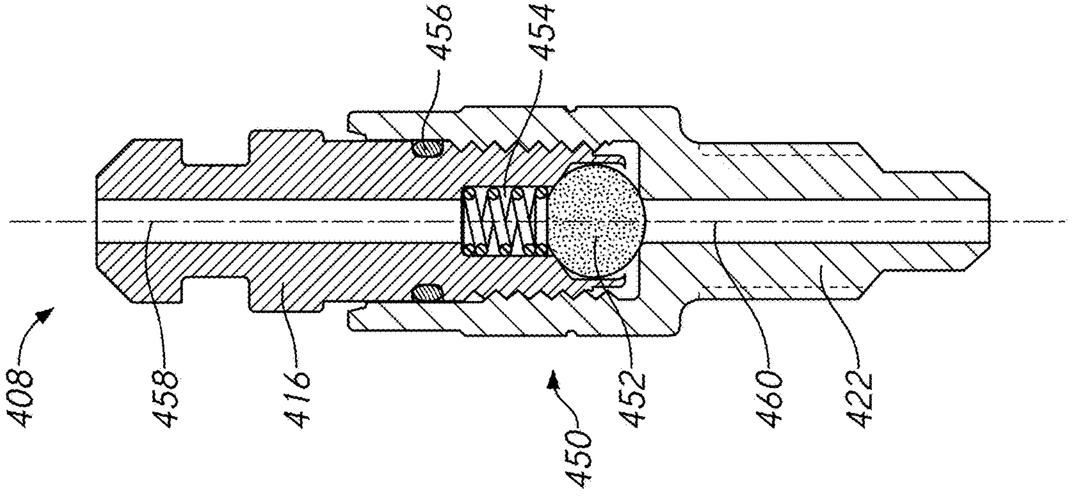

As discussed above, the cross-sectional view of FIG. 3B does not illustrate the internal features of the fluid filter drain valve 208 that enable a selectively openable fluid flow path through the fluid filter drain valve 208. FIGS. 4A-4C illustrate one example of structures that could be included within the fluid filter drain valve 208 to enable such a selectively openable fluid flow path. FIGS. 4A-4C are similar to figures included in U.S. Patent Application Publication No. 2009/0212249, titled Bleeding Screw Having a Kick-Back Valve, which is incorporated by reference herein in its entirety.

FIGS. 4A-4C illustrate a drain valve 408 having a first body 416 that is rotatable with respect to a second body 422. The first body 416 engages the second body 422 using threads, and thus rotation of the first body 416 relative to the second body 422 also causes translation of the first body 416 with respect to the second body 422.

Rotation of the first body 416 with respect to the second body 422 can selectively open or close a selectively openable valve 450, that selectively opens or closes a fluid flow path between fluid passage 458 of the first body 416 and fluid passage 460 of the second body 422. Opening and closing the valve 450 is caused by movement of a ball 452 that, in the closed configuration (shown in FIG. 4A), is forced against a proximal end of the fluid passage 460. FIGS. 4B and 4C illustrate two versions of opened configurations. In FIG. 4B, the first body 416 has been rotated with respect to the second body 422 sufficiently to cause the first body 416 to translate away from the proximal end of fluid passage 460, but not sufficiently to cause the first body 416 to pull the ball 452 away from the proximal end of the fluid passage 460. In this configuration, spring 454 biases the ball 452 against the proximal end of the fluid passage 460. Because the first body 416 is not maintaining pressure against the ball 452, however, a sufficient fluid pressure within fluid passage 460 will cause the ball 452 to move away from the proximal end of fluid passage 460, and thus allow fluid to flow from the second body 422 to the first body 416. In FIG. 4C, the first body 416 has been rotated more than in FIG. 4B, causing the first body 416 to pull the ball 452 away from the proximal end of the fluid passage 460. In such a configuration, the fluid passages 458 and 460 are fluidly coupled without requiring pressure in fluid passage 460 to force the ball 452 away from the proximal end of fluid passage 460. The drain valve 408 further comprises an O-ring 456 that seals the first body 416 to the second body 422.

It should be noted that the selectively openable valve 450 structures illustrated in FIGS. 4A-4C are merely one example of the type of valve structure that could be included in the fluid filter drain valve 208 of FIG. 3B, and various other types of valve structures could be used. For example, the fluid filter drain valve 208 may comprise an axial valve (such as, for example, the axial valve 450 of FIGS. 4A-4C), a non-axial valve, a quarter turn valve, a gate valve, and/or the like. Further, a modified version of the valve 450 of FIGS. 4A-4C may be used that does not include a spring-loaded ball, and simply has a closed configuration (equivalent to FIG. 4A) and an open configuration (equivalent to FIG. 4C), with no in between position that requires a certain amount of pressure differential to open (such as is shown in FIG. 4B). Such a design may be desirable, for example, to enable draining liquid from the fuel system even in a case where there is little or no residual pressure in the fuel filter.

Example System Diagrams

Figure 6A:
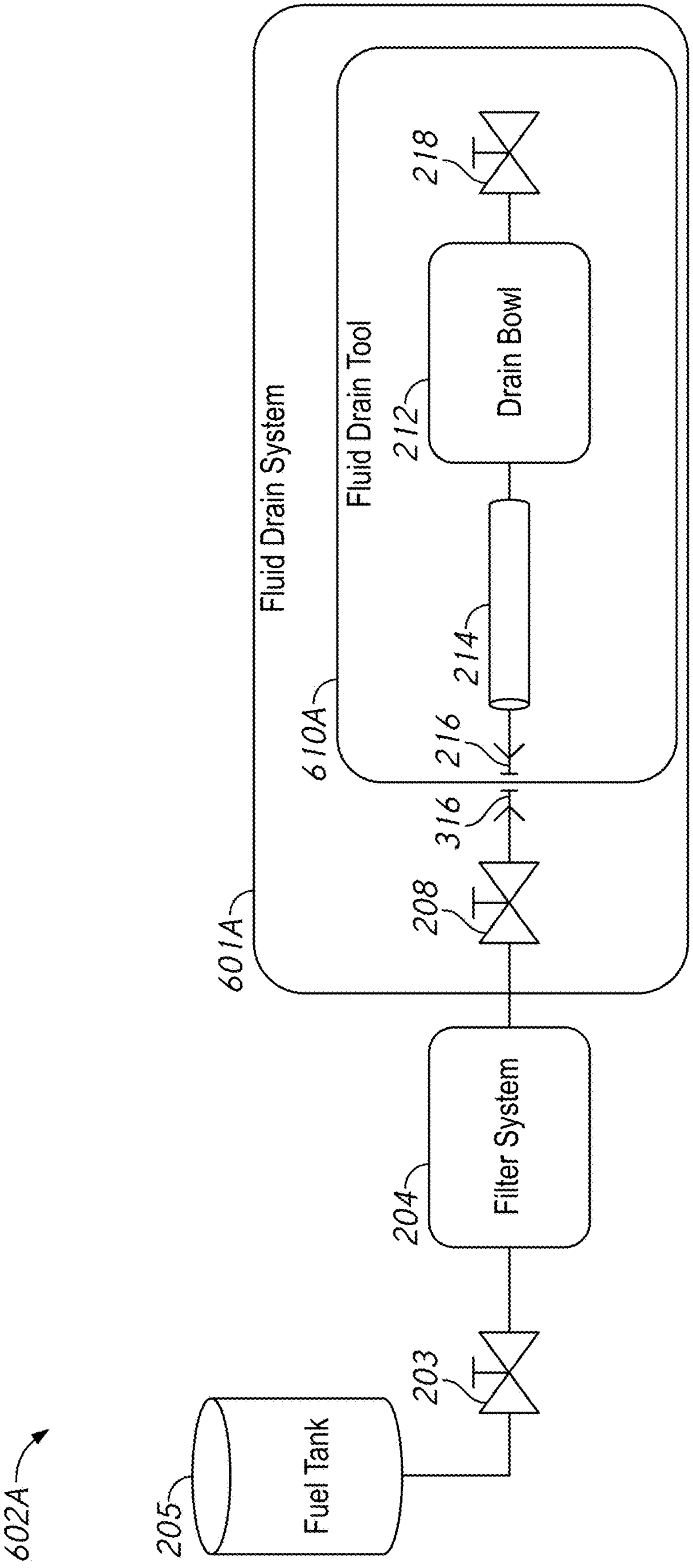
FIGS. 6A-6D illustrate embodiments of schematic diagrams of fuel systems.

FIGS. 6A, 6B, 6C, and 6D illustrate example embodiments of schematic diagrams of four fuel systems 602A, 602B, 602C, and 602D, respectively. The fuel system 602A of FIG. 6A is similar to the fuel system 102 of FIG. 2. For example, the fuel system 602A comprises a fuel tank 205 for storing a pressurized fuel, such as compressed natural gas, a filter system 204, and a shutoff valve 203 positioned functionally between the fuel tank 205 and filter system 204. The fuel system 602A further comprises a fluid drain system 601A that is similar to the fluid drain system 201 of FIG. 2. For example, the fluid drain system 601A comprises a fluid filter drain valve 208 fluidly coupled to the filter system 204, and a fluid drain tool 610A (which may be similar to fluid drain tool 210 of FIG. 2) that is removably coupled to the fluid filter drain valve 208. As in the fluid drain tool 210 of FIG. 2, the fluid drain tool 610A comprises an elongate flexible hose 214 coupled to a drain bowl 212, and a selectively openable bleed valve 218 coupled to a housing of the drain bowl 212.

Figure 6B:
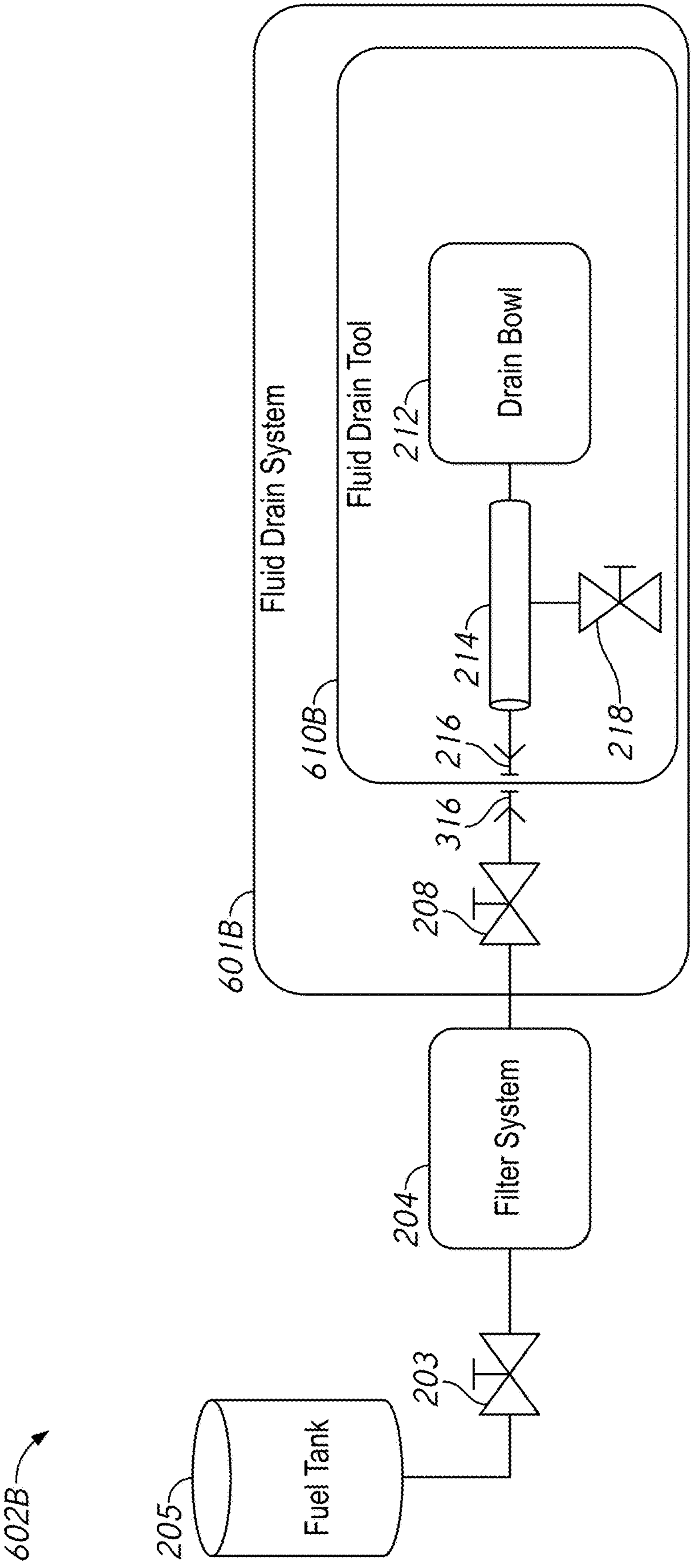
Figure 6C:
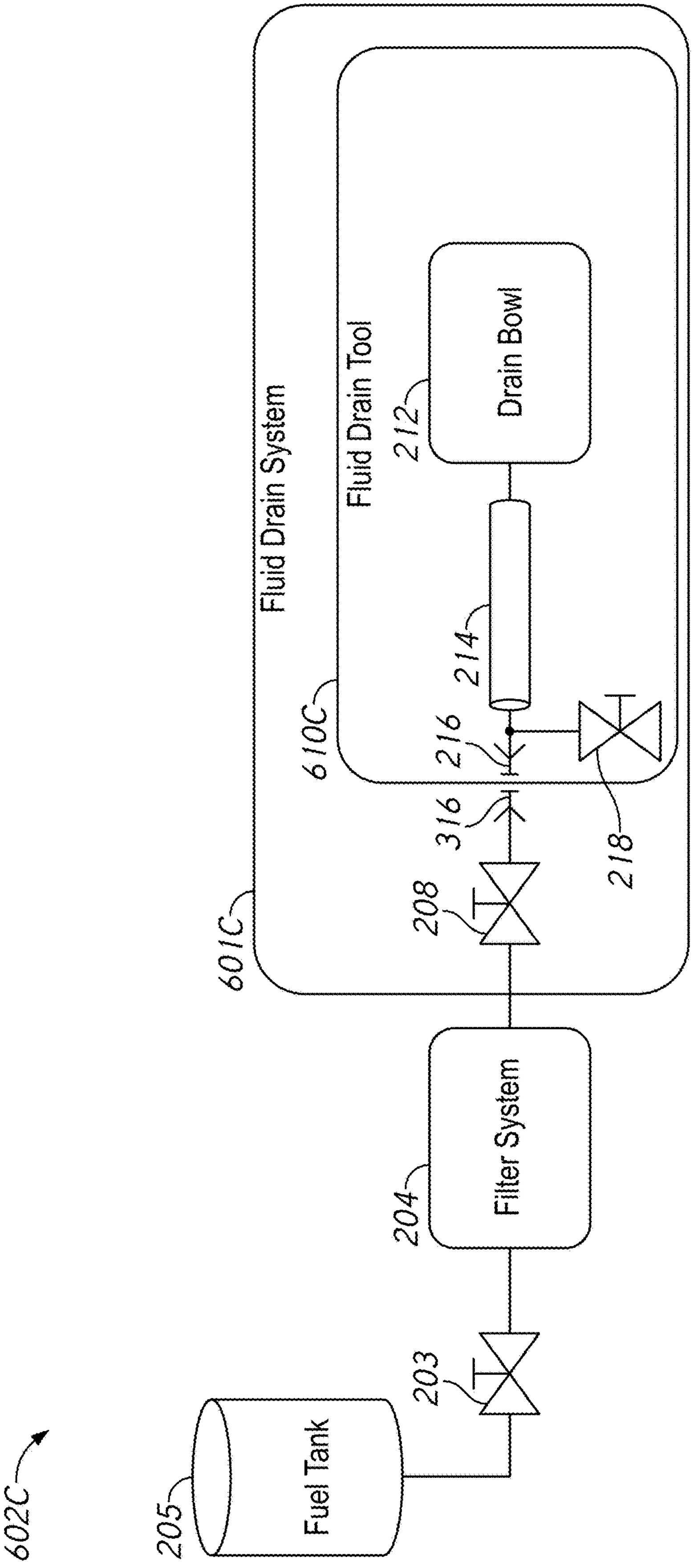
Figure 6D:
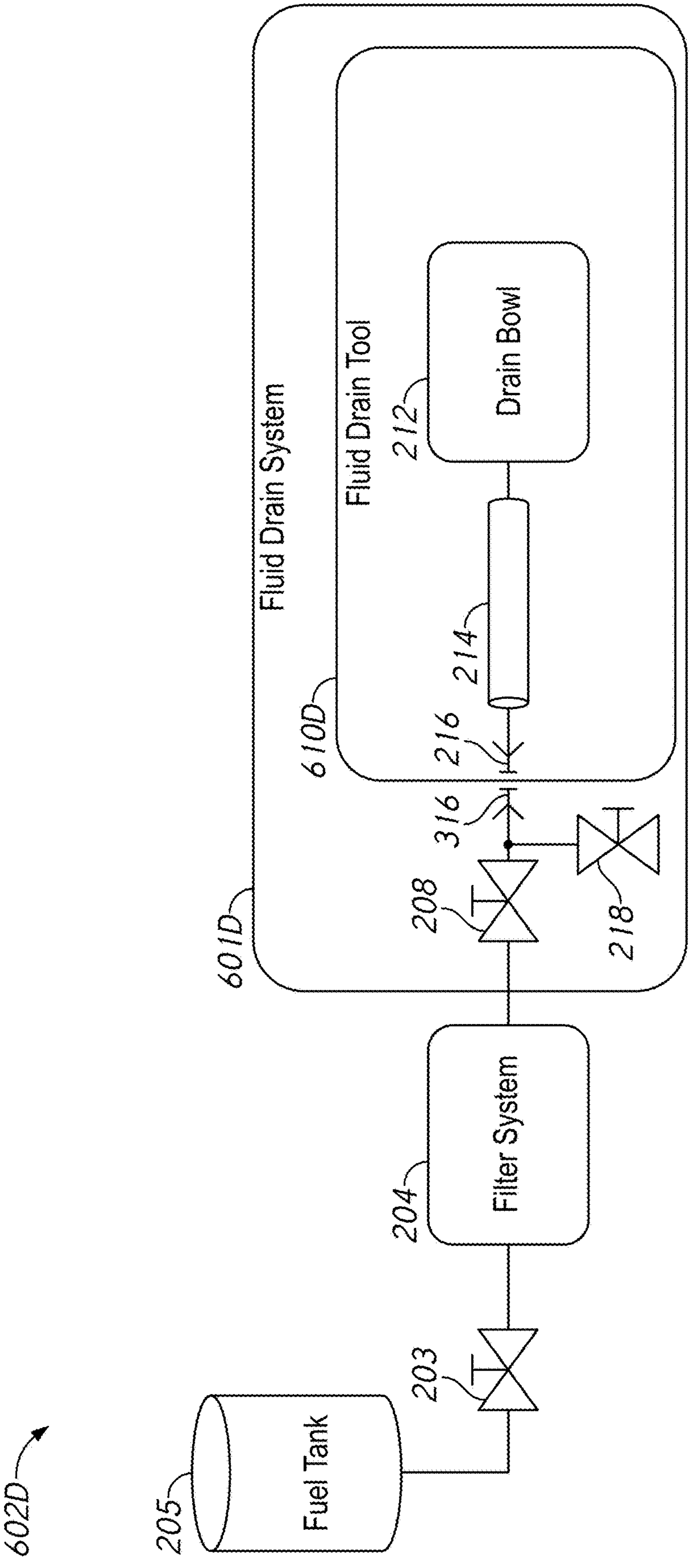

The fuel systems 602B, 602C, and 602D of FIGS. 6B, 6C, and 6D, respectively, illustrate variations on the fuel system 602A, with a main difference being where the bleed valve 218 is positioned. For example, with reference to FIG. 6B, the fluid drain system 601B comprises a fluid drain tool 610B having the bleed valve 218 coupled to the elongate flexible hose 214 instead of the housing of the drain bowl 212. For example, the bleed valve may be part of a body positioned somewhere within the length of the hose 214. As another example, with reference to FIG. 6C, the fluid drain system 601C comprises a fluid drain tool 610C having the bleed valve 218 connected to the fitting 216 instead of the housing of the drain bowl 212. As a further example, with reference to FIG. 6D, the fluid drain system 601D comprises a fluid drain tool 610D that does not include the bleed valve 218, and instead the bleed valve 218 is connected to the fitting 316 or another portion of the fluid filter drain valve 208.

It should be noted that FIGS. 6A-6D illustrate merely four examples of where the bleed valve 218 can be positioned, and other embodiments may position the bleed valve 218 differently, may include more than one bleed valve in different locations, or may not even include a bleed valve. It can be desirable to include at least one bleed valve, for example, such as to enable purging of pressure in the tool before disconnecting the tool from the fluid filter drain valve 208, and/or to assist in draining liquid in situations where little or no residual pressure is present in the filter to push the liquid into the drain bowl 212.

Example Fluid Drain Procedures

Figure 7A:
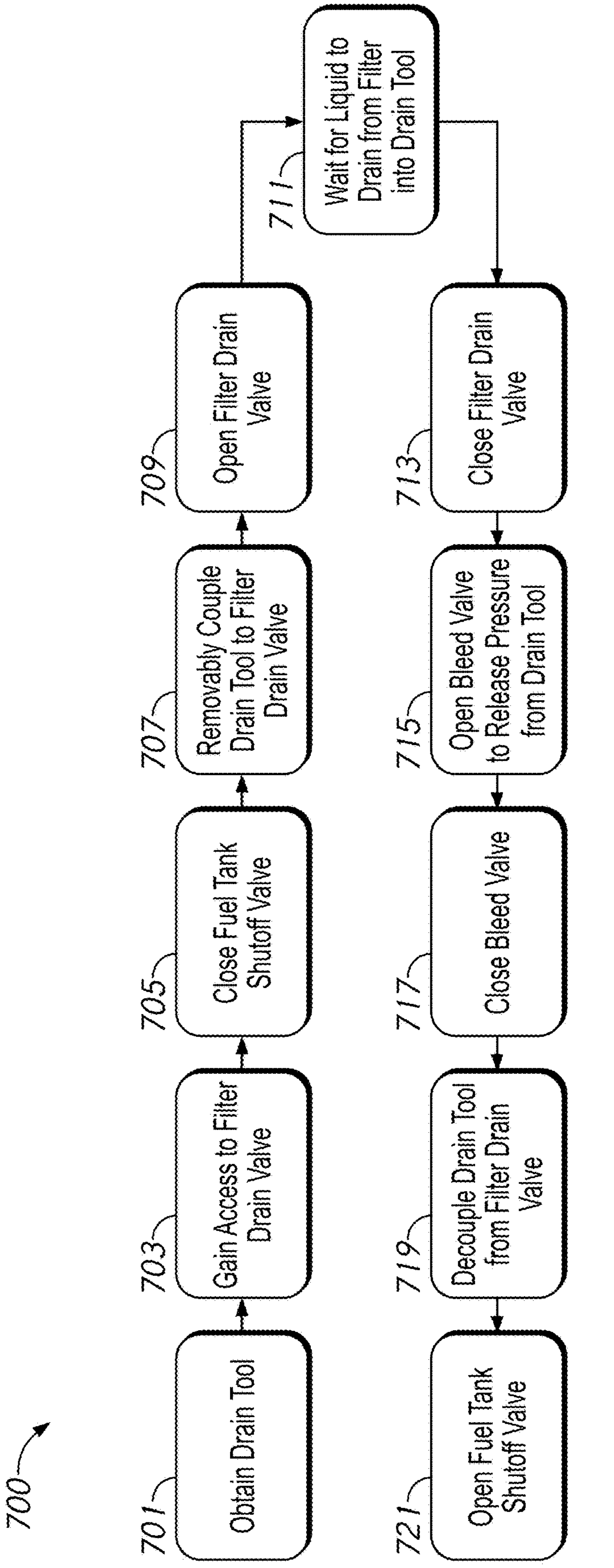
FIGS. 7A and 7B illustrate embodiments of process flow diagrams showing example liquid drain procedures.
Figure 7B:
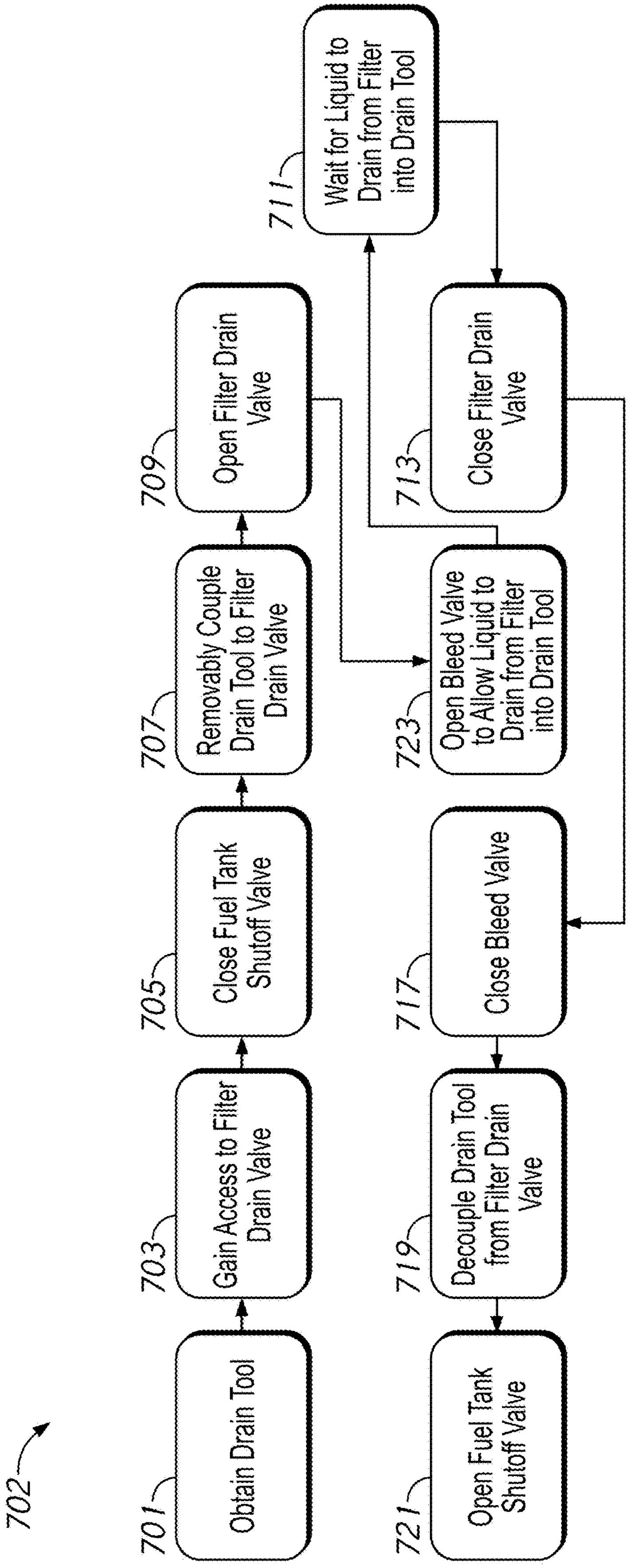

FIGS. 7A and 7B illustrate two example embodiments of process flow diagrams illustrating example processes for draining liquid from a fuel system, such as from the fluid filter 204 of FIG. 2. The process flow of FIG. 7A illustrates a process 700 for draining such liquid when there is sufficient residual pressure in the fluid filter to force the liquid into the drain bowl (such as drain bowl 212 of FIG. 2) without needing to first open a bleed valve (such as bleed valve 218 of FIG. 2). For example, the process flow of FIG. 7A may be utilized when the system is pressurized to at least 50 psi. The process flow of FIG. 7B, on the other hand, illustrates a process 702 for draining such liquid when the system is pressurized below 50 psi (or at some other pressure that is sufficiently low that a vacuum lock may occur that otherwise inhibits draining of the fluid without opening the bleed valve).

Turning to FIG. 7A, the process 700 starts at block 701 by obtaining a drain tool. For example, a maintenance technician may obtain the fluid drain tool 210 of FIG. 2. At block 703, access is gained to a filter drain valve. For example, with reference to FIG. 2, an access panel may be opened or removed in order to gain access to the internal cavity of the housing 209 of FIG. 2, in order to gain access to the fluid filter drain valve 208 of FIG. 2. At block 705, a fuel tank shutoff valve is closed, to isolate a fuel tank from a filter. For example, the shutoff valve 203 of FIG. 2 may be closed. At block 707, the fluid drain tool is removably coupled to the filter drain valve accessed at block 703.

At block 709, the filter drain valve is opened. For example, with reference to FIG. 3C, the first body 316 may be rotated with respect to the second body 322 in order to open a fluid flow path through the fluid filter drain valve 208. At block 711, the maintenance technician waits for liquid to drain from the filter into the drain tool. For example, at this point, residual pressure in the fluid filter 204 of FIG. 2 may force any liquid that has been collected in the fluid filter drain bowl or housing 206 into the fluid drain tool 210. In some embodiments, the time it takes for the liquid to be collected is between 5 seconds and 120 seconds. This relatively short period of time, in addition to the relatively short period of time required to conduct the other blocks, can be a significant benefit over alternative maintenance processes that include, among other things, having to depressurize and/or vent the fuel system before the maintenance, and then re-pressurize and/or refill the fuel system after completing the maintenance. In some embodiments, the techniques disclosed herein can save approximately 15 minutes of time as compared to alternative methods of filter maintenance.

Once the liquid has drained from the filter into the drain tool, the fluid filter drain valve is closed at block 713. At block 715, a bleed valve is opened to release pressure from within the drain tool and/or to equalize the internal pressure of the drain tool with atmospheric pressure. For example, the bleed valve 218 of FIG. 2 may be opened. At block 717, after the internal pressure of the drain tool has been released, the bleed valve is closed. At block 719, the drain tool is decoupled from the filter drain valve. In some embodiments, if an access panel or similar was required to be opened or removed in order to gain access to the filter drain valve at block 703, then such access panel or similar may also be closed or replaced at block 719. At block 721, the fuel tank shut off valve is reopened, and the fuel system can be placed back into service.

Turning to FIG. 7B, the process flow 702 illustrated in FIG. 7B is similar to the process flow 700 of FIG. 7A, except that some of the operations are performed in a different order in order to assist in draining liquid in a situation where the pressure in the fuel system and/or the fluid filter is relatively low, such as between zero and 50 psi. Specifically, the process flow of FIG. 7B is the same as the process flow of FIG. 7A through block 709, where the filter drain valve is opened. With reference to FIG. 7B, after the filter drain valve is opened at block 709, the bleed valve of the fluid drain tool is opened. This can allow fluid at relatively low pressure to still flow from the fluid filter into the drain tool. After waiting for the liquid to drain from the filter into the drain tool at block 711, the filter drain valve is then closed at block 713. Next, the bleed valve is closed at block 717, and the remainder of the process proceeds the same as described above with reference to FIG. 7A.

It should be noted that the process flows described above with reference to FIGS. 7A and 7B are merely two examples, and the systems disclosed herein may be utilized with a number of other process flows that may be different than the process flows of FIGS. 7A and 7B. For example, although FIG. 7B illustrates the bleed valve being opened after the filter drain valve, the bleed valve may be opened before the filter drain valve. Similarly, although FIG. 7B illustrates the bleed valve being closed after the filter drain valve, the bleed valve may be closed before the filter drain valve. Further, the references to 50 psi as being the threshold at which the processes of FIG. 7A or 7B would be used are merely an example, and either process may be used in various situations.

Additional Information

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A fluid drain system for high pressure fuel systems, the fluid drain system comprising:

a fluid filter drain valve comprising a first body and a second body, the first body being rotatably coupled to the second body, wherein the first body comprises a first quick-connect fitting, and the second body is configured to be coupled to a fluid filter, the fluid filter drain valve further comprising a fluid flow path through the second body and the first body, wherein the fluid flow path is selectively openable or closable by rotation of the first body with respect to the second body; and a fluid drain tool configured to be removably coupleable to the fluid filter drain valve for draining fluid through the fluid flow path and into the fluid drain tool, the fluid drain tool comprising:

a drain bowl comprising a housing that defines a collection cavity, the drain bowl further comprising a drain cap removably coupled to the housing for draining collected fluid from the collection cavity;

a second quick-connect fitting configured for removable coupling to the first quick-connect fitting of the first body of the fluid filter drain valve;

an elongate flexible hose comprising a lumen that fluidly couples the second quick-connect fitting to the drain bowl, such that fluid collected from the fluid filter drain valve can be transferred through the lumen of the elongate flexible hose to the collection cavity of the drain bowl; and a selectively openable bleed valve coupled to the housing of the drain bowl, the selectively openable bleed valve having a first end in fluid communication with the collection cavity of the drain bowl, and a second end in fluid communication with an atmosphere.

2. The fluid drain system of claim 1, wherein the lumen of the elongate flexible hose and the collection cavity of the drain bowl are capable of containing fluid pressurized to at least 4,500 psi without failure.

3. The fluid drain system of claim 1, wherein the collection cavity of the drain bowl and the lumen of the elongate flexible hose are configured to be sealed from the atmosphere when the drain cap is coupled to the housing, the selectively openable bleed valve is closed, the second quick-connect fitting of the fluid drain tool is coupled to the first quick-connect fitting of the first body of the fluid filter drain valve, and the fluid flow path of the fluid filter drain valve is sealed from the atmosphere.

4. The fluid drain system of claim 1, wherein the collection cavity of the drain bowl and the lumen of the elongate flexible hose are configured to be in fluid communication with the atmosphere only through the second quick-connect fitting, when the drain cap is coupled to the housing, the selectively openable bleed valve is closed, and the second quick-connect fitting is not coupled to the first quick-connect fitting of the first body of the fluid filter drain valve.

5. The fluid drain system of claim 4, wherein the second quick-connect fitting comprises a check valve that selectively restricts fluid communication of the collection cavity of the drain bowl and the lumen of the elongate flexible hose with the atmosphere.

6. A fluid drain system for pressurized fuel systems, the fluid drain system comprising a fluid drain tool that comprises:

an enclosure comprising a collection cavity and a drain cap;

a fitting configured for removable coupling to a fluid filter drain valve to fluidly couple the fluid drain tool to the fluid filter drain valve;

a tube that fluidly couples the fitting to the enclosure, such that fluid collected from the fluid filter drain valve can be transferred through the tube to the collection cavity of the enclosure; and a selectively openable valve having a first end in fluid communication with the collection cavity of the enclosure, and a second end in fluid communication with an atmosphere, wherein the collection cavity of the enclosure and a fluid passage of the tube are configured to be in fluid communication with the atmosphere only through the fitting, when the drain cap is coupled to the enclosure, the selectively openable valve of the fluid drain tool is closed, and the fitting is decoupled from the fluid filter drain valve.

7. The fluid drain system of claim 6, wherein the tube comprises an elongate flexible hose.

8. The fluid drain system of claim 6, wherein the enclosure comprises a drain bowl having a housing disposed about the collection cavity, the selectively openable valve of the fluid drain tool being coupled to the housing of the drain bowl.

9. The fluid drain system of claim 6, wherein the fitting comprises a first fitting and the fluid filter drain valve comprises:

a second fitting configured for the first fitting of the fluid drain tool to be removably coupled thereto; and a selectively openable fluid flow path having a first end in fluid communication with the second fitting, and a second end configured to be in fluid communication with a fluid filter.

10. The fluid drain system of claim 9, wherein the fluid filter drain valve comprises a first body and a second body, the first body being rotatably coupled to the second body, wherein the first body comprises the second fitting, and the second body is configured to be coupled to the fluid filter.

11. The fluid drain system of claim 10, wherein the selectively openable fluid flow path is configured to be opened or closed by rotation of the first body with respect to the second body.

12. The fluid drain system of claim 6, wherein the fluid filter drain valve comprises a body and a handle rotatably coupled to the body, wherein a fluid flow path is configured to be selectively openable by rotating the handle with respect to the body.

13. The fluid drain system of claim 9, wherein the enclosure comprises a drain cap, and wherein the collection cavity of the enclosure and a fluid passage of the tube are configured to be sealed from the atmosphere when the drain cap is coupled to the enclosure, the selectively openable valve of the fluid drain tool is closed, the first fitting of the fluid drain tool is coupled to the second fitting of the fluid filter drain valve, and the fluid flow path of the fluid filter drain valve is sealed from the atmosphere.

14. The fluid drain system of claim 6, wherein the fitting comprises a check valve that selectively restricts fluid communication of the collection cavity of the enclosure and the fluid passage of the tube with the atmosphere.

15. The fluid drain system of claim 6, wherein the fluid passage of the tube and the collection cavity of the enclosure are capable of containing fluid pressurized to at least 4,500 psi without failure.

16. A method of draining fluid from a high pressure fuel system, the method comprising:

obtaining the fluid drain tool recited in claim 6;

closing a shutoff valve that seals off a fuel tank from a fuel filter;

coupling the fitting of the fluid drain tool to a drain valve of the fuel filter;

opening the drain valve of the fuel filter;

closing the drain valve of the fuel filter;

opening the selectively openable valve of the fluid drain tool;

closing the selectively openable valve of the fluid drain tool;

decoupling the fitting of the fluid drain tool from the drain valve of the fuel filter; and opening the shutoff valve.

17. The method of claim 16, wherein the opening of the selectively openable valve of the fluid drain tool occurs after the closing of the drain valve.

18. The method of claim 16, wherein the opening of the selectively openable valve of the fluid drain tool occurs before the closing of the drain valve.

19. The method of claim 16, wherein the enclosure of the fluid drain tool further comprises a drain cap, and the method further comprises removing the drain cap to drain collected fluid from the collection cavity of the enclosure of the fluid drain tool.

20. The method of claim 16, wherein the drain valve is located within a cavity of a fuel system housing of a vehicle, and wherein the tube of the fluid drain tool comprises an elongate flexible hose, the elongate flexible hose having a length sufficient to position the enclosure of the fluid drain tool outside of the cavity of the fuel system housing when the fitting is connected to the drain valve.

* * * * *